US006266617B1

(12) United States Patent
Evans

(10) Patent No.: US 6,266,617 B1
(45) Date of Patent: Jul. 24, 2001

(54) METHOD AND APPARATUS FOR AN AUTOMATIC VEHICLE LOCATION, COLLISION NOTIFICATION AND SYNTHETIC VOICE

(76) Inventor: Wayne W. Evans, 16218 Henderson Rd., Alpharetta, GA (US) 30004

( * ) Notice: Subject to any disclaimer, the term of this patent is extended or adjusted under 35 U.S.C. 154(b) by 0 days.

(21) Appl. No.: 09/593,044

(22) Filed: Jun. 12, 2000

Related U.S. Application Data

(60) Provisional application No. 60/138,469, filed on Jun. 10, 1999.

(51) Int. Cl.[7] .............................. G06G 7/78; G06F 17/10

(52) U.S. Cl. .......................... 701/301; 701/207; 701/209; 701/211; 701/213; 701/214; 340/436; 340/991; 342/357.01; 342/357.09

(58) Field of Search .................................... 701/200, 207, 701/209, 211, 213, 214, 215, 220, 300, 301; 340/436, 438, 991, 995; 342/357.01, 357.06, 357.09, 357.12, 357.13; 455/3.1, 404

(56) References Cited

U.S. PATENT DOCUMENTS

| | | | | |
|---|---|---|---|---|
| 5,629,693 | * | 5/1997 | Janky | 340/988 |
| 5,929,752 | * | 7/1999 | Janky et al. | 340/426 |
| 5,938,718 | * | 8/1999 | Morimoto et al. | 701/201 |
| 6,055,426 | * | 4/2000 | Beasley et al. | 455/432 |

OTHER PUBLICATIONS

Car Navigation System 1 Sheets.
Co–Pilot GPS In–Car Navigation Assitant 2 Sheets.

* cited by examiner

*Primary Examiner*—William A. Cuchlinski, Jr.
*Assistant Examiner*—Gertrude Arthur
(74) *Attorney, Agent, or Firm*—Patent Focus, Inc.; Richard C. McCormas

(57) ABSTRACT

An automatic system for vehicle location, collision notification, and synthetic voice communication having, if desired, three distinct operating modes: pre-collision, collision, and post-collision with another vehicle or object. A program stored in a controller's memory has a plurality of data structures formulated into instruction modules and at least one navigational location record. A Global Positioning Module receives data from an associated Global Positioning System and translates the received data into the vehicle's present navigational position. An Automatic Speed Controlled Location Detection Module in communication with the Global Positioning Module dynamically searches the memory for a match between the vehicle's present navigational position and the navigational location record. The Automatic Speed Controlled Collision Detection Module in communication with the Automatic Speed Controlled Location Detection Module formulates the match between the vehicle's navigational position and the navigational location record into a collision event. A Data to Speech Translation Module in communication with the Automatic Speed Controlled Collision Detection Module translates the collision event into a synthetic voice. The wireless communication means transmits the synthetic voice to a recipient or third party.

11 Claims, 21 Drawing Sheets

METHOD AND APPARATUS FOR AN AUTOMATIC VEHICLE LOCATION, COLLISION NOTIFICATION AND SYNTHETIC VOICE

This application claims the benefit of U.S. Provisional Application No. 60/138,469 filed on Jun. 10, 1999.

FIELD OF THE INVENTION

The invention relates, in general, to an apparatus for automatic vehicle location, collision notification, and synthetic voice communication. In particular, the invention relates to a controller with a memory, a Global Positioning System, and means for wireless communication connectively disposed within a vehicle. More particularly the invention relates to a plurality of data structures stored in the memory wherein the data structures are formulated into instruction modules to direct the functioning of the controller.

BACKGROUND OF THE INVENTION

Travel information has long been available to motorists of all types. Historically, motorists in all types of vehicles would ask route or travel directions from gas station attendants, and convenience store operators or they would consult a map of the local area in question. In 1967, the Global Positioning System (GPS) became commercially available. The GPS system consists of a plurality of satellites that are in orbit around the earth and beam positional information towards the surface of the earth. A receiver on the surface of the earth may, if desired, receive the beamed signals and is able to determine their relative positions. If the receiver is mounted in a vehicle such as an automobile, truck, airplane, or motorcycle, the relative position and direction of travel can be determined by receiving multiple GPS signals and computing the direction of travel. An example of this type of navigational system is produced by ALK Associates under the product name of CO-Pilot 2000.

The motorist, operator, driver, or user of the CO-Pilot 2000 system communicates with the system by entering information concerning this expected destination and CO-Pilot 2000 plots the trip using GPS information. The CO-Pilot 2000 may, if desired, enunciate approaching intersections and respond to voice commands from the user. This type of system is dedicated to the vehicle and the navigational information derived from GPS positional notation of the vehicle is for the users of the system and is not transmitted to a third party. If the user in the vehicle desires communication with a third party, he must use a wireless form of communication such as an analog or digital telephone i.e., cellular or PCS telephone.

An automatic communication link between a user in the vehicle and the third party can be established. Current technology permits collision detection of the vehicle and notification of the collision to a third party. The Transportation Group of Veridian Engineering Company manufactures a product entitled the Mayday System. The Mayday System combines Co-Pilot 2000 like technology with wireless telephone technology to produce a system that automatically communicates the vehicle's position to a third party. The third party is a tracking station or base station that is operator attended. If the user is involved in a vehicular collision, the Mayday System senses the collision and notifies the base station via wireless communication. The actual vehicular collision sensors encode the collision event in digital data form and transmit the data to the base station.

The receiving base station plots the data on an operator attended computer screen. The operator can visually recognize that a particular vehicle collision has occurred and can take appropriate action or perform a predetermined sequence of tasks. Examples of predetermined tasks may include contacting emergency services in the vicinity of the vehicular collision or communicating directly with the vehicle to determine the extent of damage to the vehicle, or injuries to the driver or vehicle occupants. In effect, the third party contacted by the Mayday system directs the efforts to a fourth party. The fourth party may be emergency services of some type or any other response to the directive data from the vehicle.

The Mayday system is predicated on the need for receiving the third party base station operator having a computer screen capable of plotting the received encoded digital information from the vehicle in order to determine its location. The user must also be physically able to respond to voice communications from the base station operator. The functional caveat of the Mayday System is that if no encoded information is received from the vehicle the base station operator will never be informed that a vehicular collision has occurred. If the user of the Mayday system is physically impaired due to the inability to speak or does not speak the language of the base station operator, the user cannot communicate directly with the operator.

It would be desirable to have an automatic vehicle location and collision notification system that would ascertain if a vehicular collision had occurred and communicate directly with an emergency facility. The system would notify an emergency facility in the vicinity of the vehicular collision without first notifying an intermediate operator who has to relay the collision event and possible emergency necessity to the emergency facility. The system would be capable of transmitting vehicle collision location data and pertinent data concerning the vehicle operator or occupants. It would be able to translate and transform this data into synthetic voice communication using any desired language for the present location of the vehicle. The synthetic voice communication would speak the vehicle collision location and pertinent data directly to a third party who would immediately dispatch emergency personnel to the collision location. If the system were unable to communicate with a first selected third party, the system would speak the data to a second or subsequent selected third party. This process of communicating would continue until a voice link between the system and a third party was established.

SUMMARY OF THE INVENTION

A motorist, operator, driver, or user of the present invention may at some point in his operation of a vehicle be involved in a collision with another vehicle or object. If the user is physically impaired or mute during pre-collision, collision, or post-collision he may not be able to with a recipient of an emergency communiqué or third party to gain emergency services.

The present invention is an apparatus for automatic vehicle location, collision notification, and synthetic voice communication to a selected recipient or third party i.e., emergency services, any subsequent desired recipient, or third party directly from the vehicle. The present invention does not rely on communication to the recipient or third party via a base-station operator who then relays the communiqué to the emergency service. The present invention may, if desired, communicate with any selected recipient or third party even if there is no immediate collision or emergency. An example of the user desiring to communicate with the recipient or third party is the user who is physically impaired and desires to communicate his present vehicle navigation position to the recipient or third party. The present invention may, if desired, be polled or interrogated as to the vehicle's present navigational location. The polling or interrogating remotely may, if desired, be accomplished without notifying the driver or occupants of the vehicle. All transmissions of navigational location of the vehicle or attributes concerning the driver or other occupants of the vehicle are by synthetic voice. If desired all information or data collected during a collision may be manually retrieved either by synthetic voice or in digital data using a simple Text Editor with a laptop PC or equivalent connected to the system serial port.

The present invention has a computer or controller with a memory. The memory may, if desired, be a combination of types such as a read only memory as with a CD-ROM, an encoded floppy disk, a Read/Write sold state memory or random access either dynamic or static. A Global Positioning System and means for wireless communication are connected to the controller in the vehicle. The memory has stored therein a plurality of data structures formulated into interactive instruction modules to direct the functioning of the controller. The memory further has stored therein at least one navigational location record and statistical information about preceding events such as a collision profile.

A Global Positioning Module receives navigation or position data from the Global Positioning System. The Global Positioning Module selectively translates the received data into the vehicle's present navigational position. An Automatic Speed Controlled Location Detection Module in communication with the Global Positioning Module dynamically searches the memory for a match between the vehicle's present navigational position and the navigational location record. An Automatic Speed Controlled Collision Detection Module receives at least one vehicle collision indicator from at least one vehicle collision sensor. The Automatic Speed Controlled Collision Detection Module in communication with the Automatic Speed Controlled Location Detection Module formulates the match between the vehicle's navigational position and the navigational location record into a collision event. A Data to Speech Translation Module in communication with the Automatic Speed Controlled Collision Detection Module translates the collision event into a synthetic voice. A Wireless Voice Communications Module in communication with the Data to Speech Translation Module and the means for wireless communication transmits the synthetic voice to the selected recipient or third party.

The present invention may, if desired, have a Dynamic Speed to Record Detector Range Converter in communication with the Automatic Speed Controlled Location Detection Module. The Dynamic Speed to Record Detector Range Converter has at least one range factor data structure relative to the speed of the vehicle. The range factor data structure transforms the navigational record into a look-ahead navigational record, whereby the Dynamic Speed to Record Detector Range Converter continuously communicates expected vehicle navigation position relative to the speed of the vehicle via the Data to Speech Translation Module. For example, when the vehicle approaches a street intersection the speed of the vehicle is ascertained and a -R-factor relative to that speed is appended to the approaching street intersection. When the vehicle is within a predetermined range or distance from the street intersection the Data to Speech Translation Module enunciates in a synthetic voice the name of the street intersection or any other desired denotation. The -R-factor is dynamic i.e., small values of -R- pertain to slower moving vehicles and larger values of -R- pertain to faster moving vehicles. With small values of -R-, street intersections immediately in range of the vehicle are enunciated. As the speed of the vehicle increase so does the -R- factor and range to the expected street intersection. For example, the higher the speed of the vehicle, the larger the -R- factor, the more distant the expected street intersection is enunciated by the Data to Speech Translation Module.

A Data to Speech Translation Module announces the approaching of a selected intersection location. The announced intersection location is derived, in part, from the look-ahead navigational record store in memory. The look-ahead navigational record is continuously or dynamically updated as the speed of the vehicle changes i.e., larger or smaller values of -R-.

When taken in conjunction with the accompanying drawings and the appended claims, other features and advantages of the present invention become apparent upon reading the following detailed description of embodiments of the invention.

BRIEF DESCRIPTION OF THE DRAWINGS

The invention is illustrated in the drawings in which like reference characters designate the same or similar parts throughout the figures of which.

DETAILED DESCRIPTION OF THE PREFERRED EMBODIMENT OF THE PRESENT INVENTION

Figure 1A:
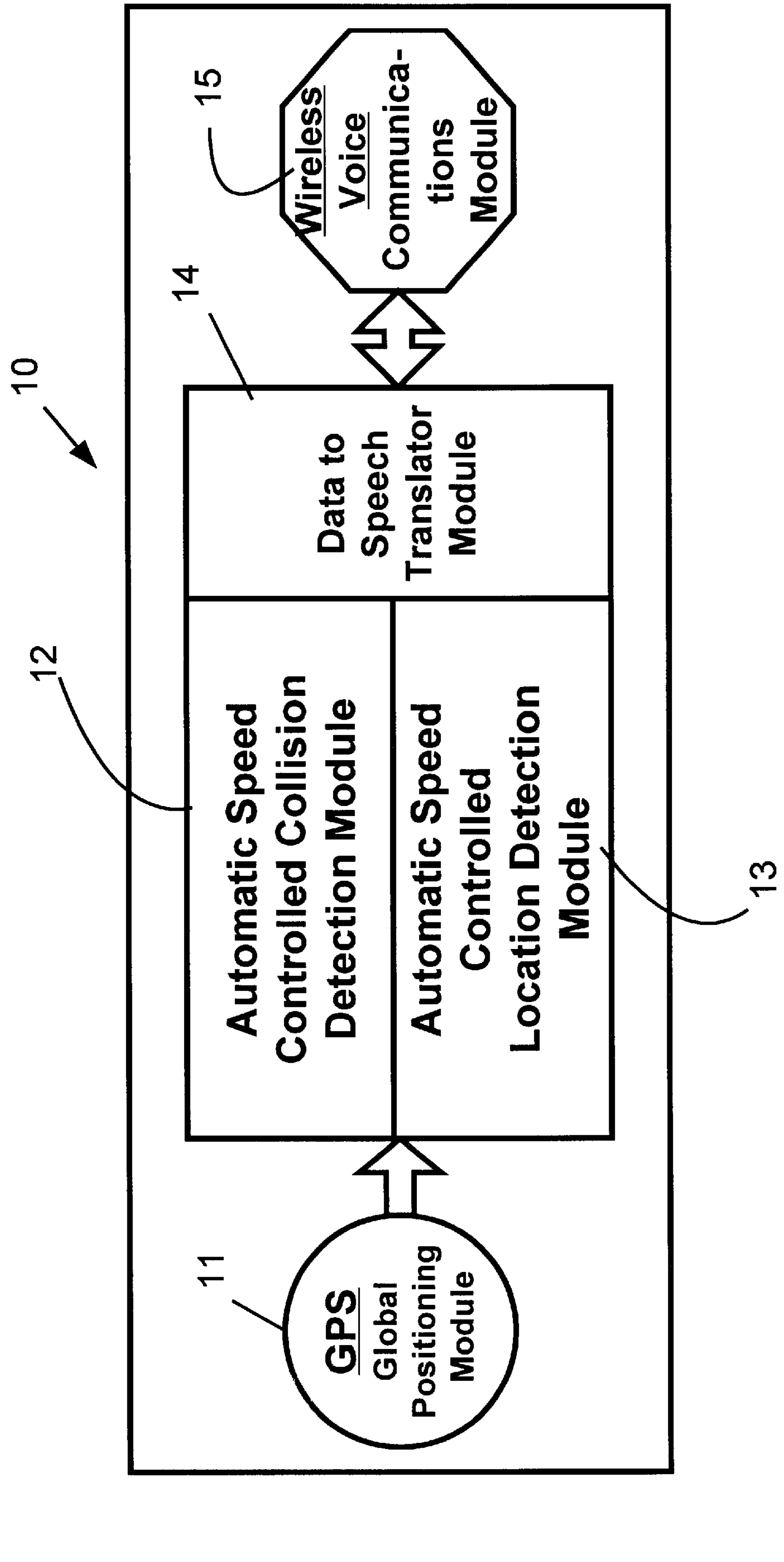
FIG. 1A illustrates a top level block diagram view of the preferred embodiment of the present invention.

The present invention 10, FIG. 1A is an automatic vehicle location, collision notification, and synthetic voice communication system. The present invention 10 may, if desired, be installed in any type of vehicle. Examples of vehicles are automobiles, trucks, airplanes, or motorcycles. The installation of the present invention 10 may, if desired, be in any location on the vehicle that is available or known by those skilled in the art of installation of communication equipment on vehicles. The present invention 10 functions or operates in a totally hands-free and eye-free environment. Since the present invention 10 is automatic, no operator intervention or special requirements are placed on a user, driver, or occupant of the vehicle. The user may receive the benefit of the present invention 10 if physically impaired or otherwise incapacitated during pre-collision, collision, or post-collision of the vehicle with another vehicle or object.

The present invention 10, FIG. 1A has a plurality of functions. If desired the present invention 10 provides a positional location of the vehicle, automatic emergency transmittal of pertinent information during post-collision, silent monitoring of the vehicle from any remote location, wireless communication via any analog or digital type voice telecommunications system. The present invention 10 may further, if desired, provide the recording of pertinent information for local or remote synthetic voice retrieval, look-ahead range finding for expected vehicle position with off route location rejection, vehicle tracking from any remote telephone, in vehicle Real Time synthetic voice enunciation of navigation information such as Location, Speed and Direction and Local or Remote Retrieval of Accident Investigation information.

Figure 16:
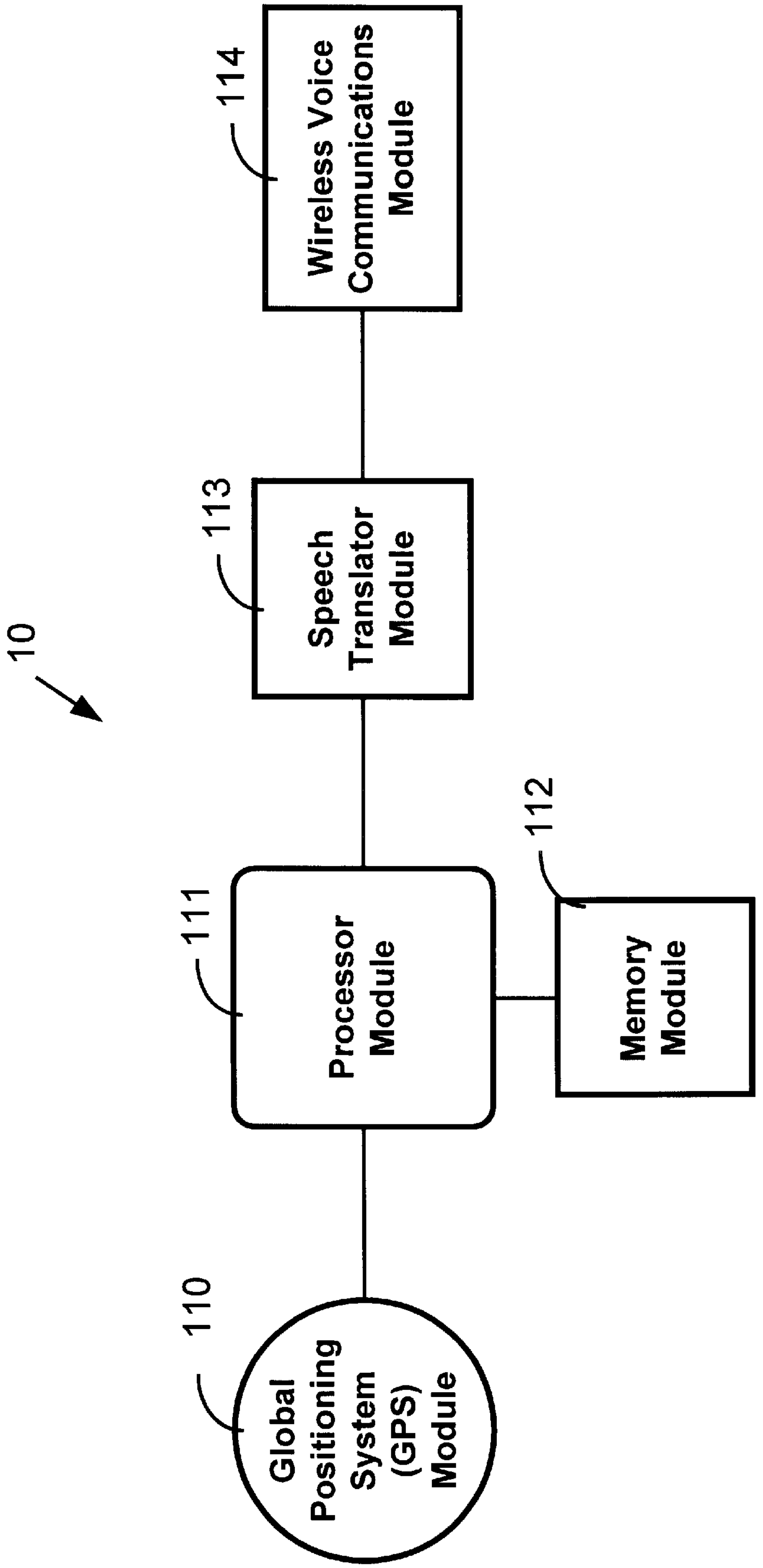
FIG. 16 illustrates a block diagram view of the hardware components of the present invention 10.

The present invention 10, FIG. 1A receives raw positional, directional, and timing data from a Global Positioning Receiver 110, FIG. 16 via a Global Positioning Software Module 11, FIG. 1A. The Global Positioning Module 11 selectively requests, restructures, and interprets navigational position and timing data for an Automatic Speed Controlled Collision Detection Module 12. The Automatic Speed Controlled Collision Detection Module 12 requests present or current vehicle location from an Automatic Speed Controlled Location Detection Module 13. The Automatic Speed Controlled Location Detection Module 13 dynamically searches its database or controller memory (delineated herein) for a match between selected data from the Global Positioning Module 11 and the dynamic location of the vehicle stored in its database. After a selected period of time or when a match occurs the Automatic Speed Controlled Location Detection Module 13 reports its findings to the Automatic Speed Controlled Collision Detection Module 12.

In parallel or sequentially the Automatic Speed Controlled Collision Detection Module 12 polls at least one collision detection sensor and determines if a collision has occurred within a selected time interval. If a collision has occurred, the present invention 10 stores in its memory all pertinent collision event information or data concerning the vehicle, location, direction, time, speed, and occupant attributes. A Data to Speech Translation Module 14 in communication with the Automatic Speed Controlled Collision Detection Module 12 receives selected data from the Automatic Speed Controlled Collision Detection Module 12. The Data to Speech Translation Module 14 translates the received selected data into any desired synthetic speech or language usable by any analog or digital wireless telephone. The Data to Speech Translation Module 14 generates selected tones and commands to communicate with an intended selected recipient or third party or third party wireless communication system.

A Wireless Voice Communications Module 15 in communication with the Data to Speech Translation Module 14 receives the translated selected tones and commands for transmission to the recipient or third party. The Wireless Voice Communications Module 15 transmits, via wireless communication 20, FIG. 1B the selected data concerning the vehicle, location, or occupants to the selected recipient or third party in any selected language. The recipient or third party via wireless, landline, or other known in the art communication medium 21 receives the communiqué from the vehicle. The recipient or third party may, if desired, respond to the communication by notifying the appropriate emergency personnel or performing other selected activities. An example of another selected activity is silently polling or communicating with the vehicle to validate the occurrence of the collision. The polling or communication with the vehicle is not dependent on a response from the vehicle occupants or driver. The information requested from the vehicle may, if desired, be all or part of the stored information concerning any aspect of the collision, vehicle, vehicle location, or occupants of the vehicle.

Figure 1B:
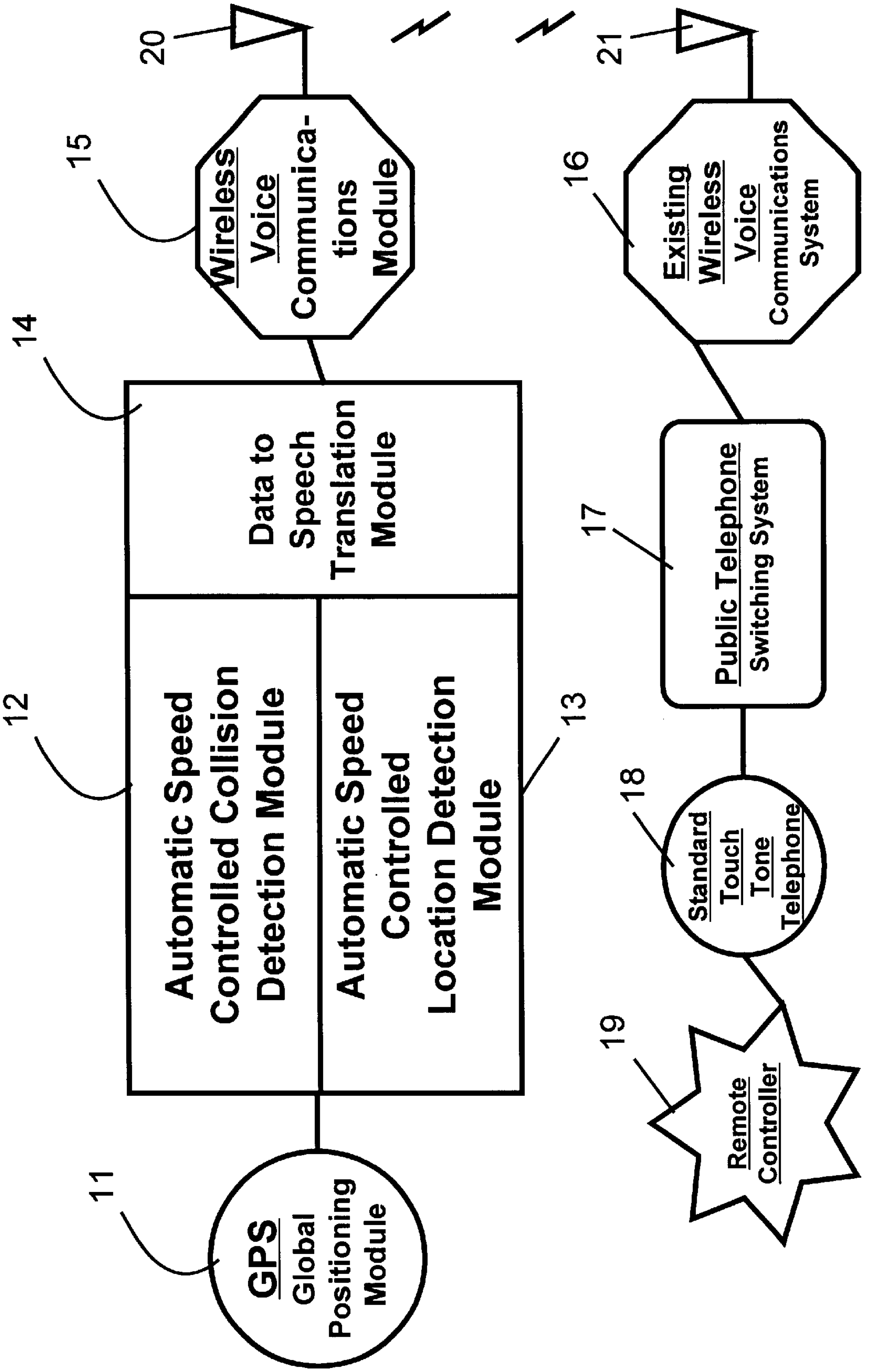
FIG. 1B illustrates a top level block diagram view of present invention of FIG. 1A in communication with a recipient or third party.

The Existing Wireless Voice Communications System 16, FIG. 1B may, if desired, be cellular technology based, satellite communication technology based, or any communication medium known to those skilled in the art of telecommunications. The Existing Wireless Voice Communications System 16 is connected to or in communication with a Public Telephone Switching System 17. The Public Telephone Switching System 17 provides the typical and known infrastructure to communicate with mobile or wireless transmission mediums. The Public Telephone Switching System 17 is in communication with a Standard Touch Tone Telephone 18, The Standard Touch Tone Telephone 18 may, if desired, be integral to a Remote Controller 19. The Remote Controller 19 may, if desired, be any communication facility capable of responding to incoming voice communication. Since the present invention 10 transmits synthetic voice, no dialogue is required by the recipient or third party at the remote facility. The recipient or third party need only respond to the commands provided by the data contained in the synthetic speech.

Figure 7:
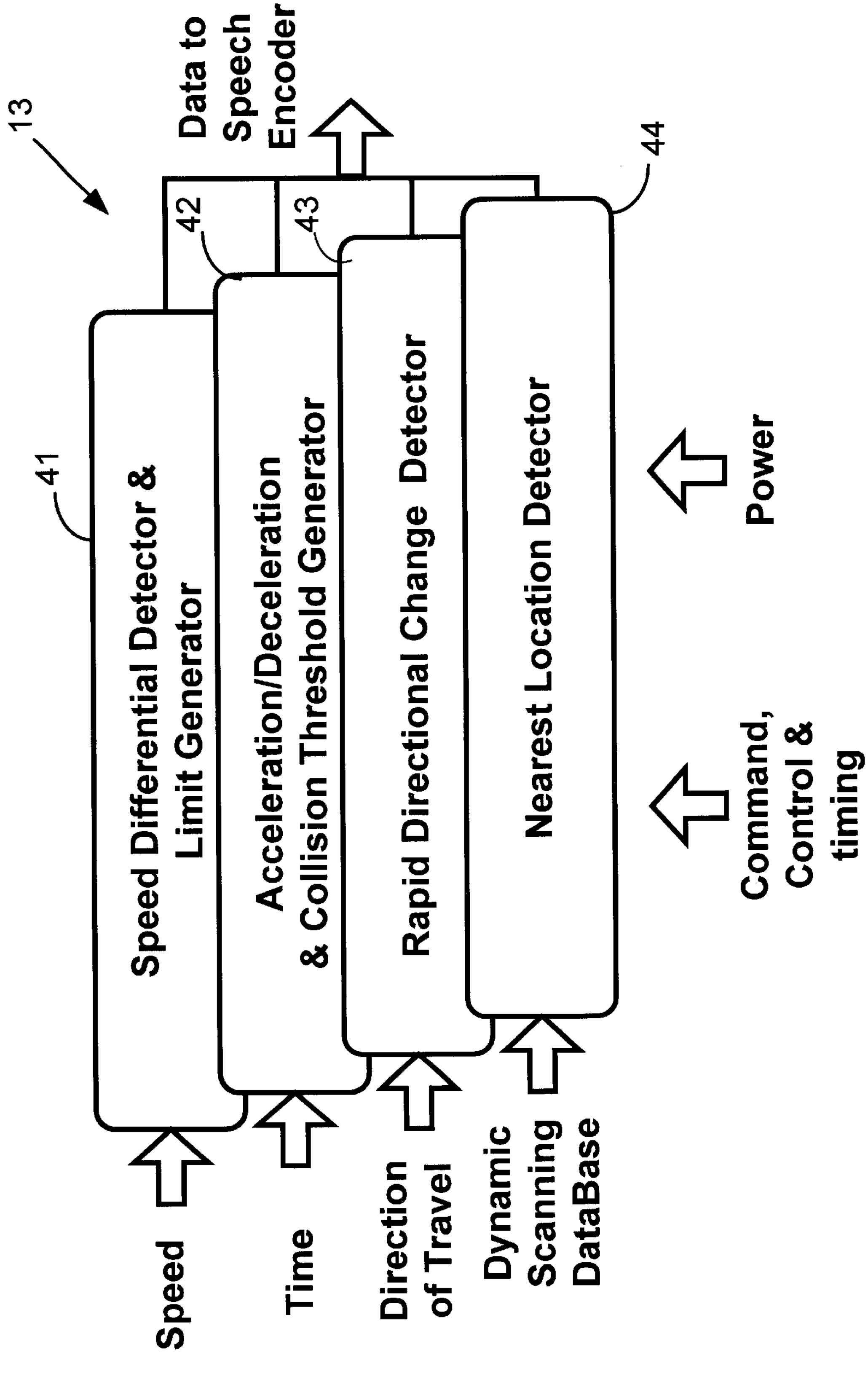
FIG. 7 illustrates a block diagram view of the Automatic Speed Controlled Collision Detection Module of FIG. 2.

The Automatic Speed Controlled Location Detection Module 13, FIG. 7 has logic or data structures to convert GPS speed (velocity) from kilometers per hour to miles per hour and feet per second via a speed differential detector and limit generator 41. The speed differential detector and limit generator 41 receives data from the Dynamic Scanning Database Module 25 and calculates the difference in speed of the vehicle between successive 1-second GPS data signals. This Speed Difference for each 1-second interval equates to Acceleration or Deceleration.

Figure 2:
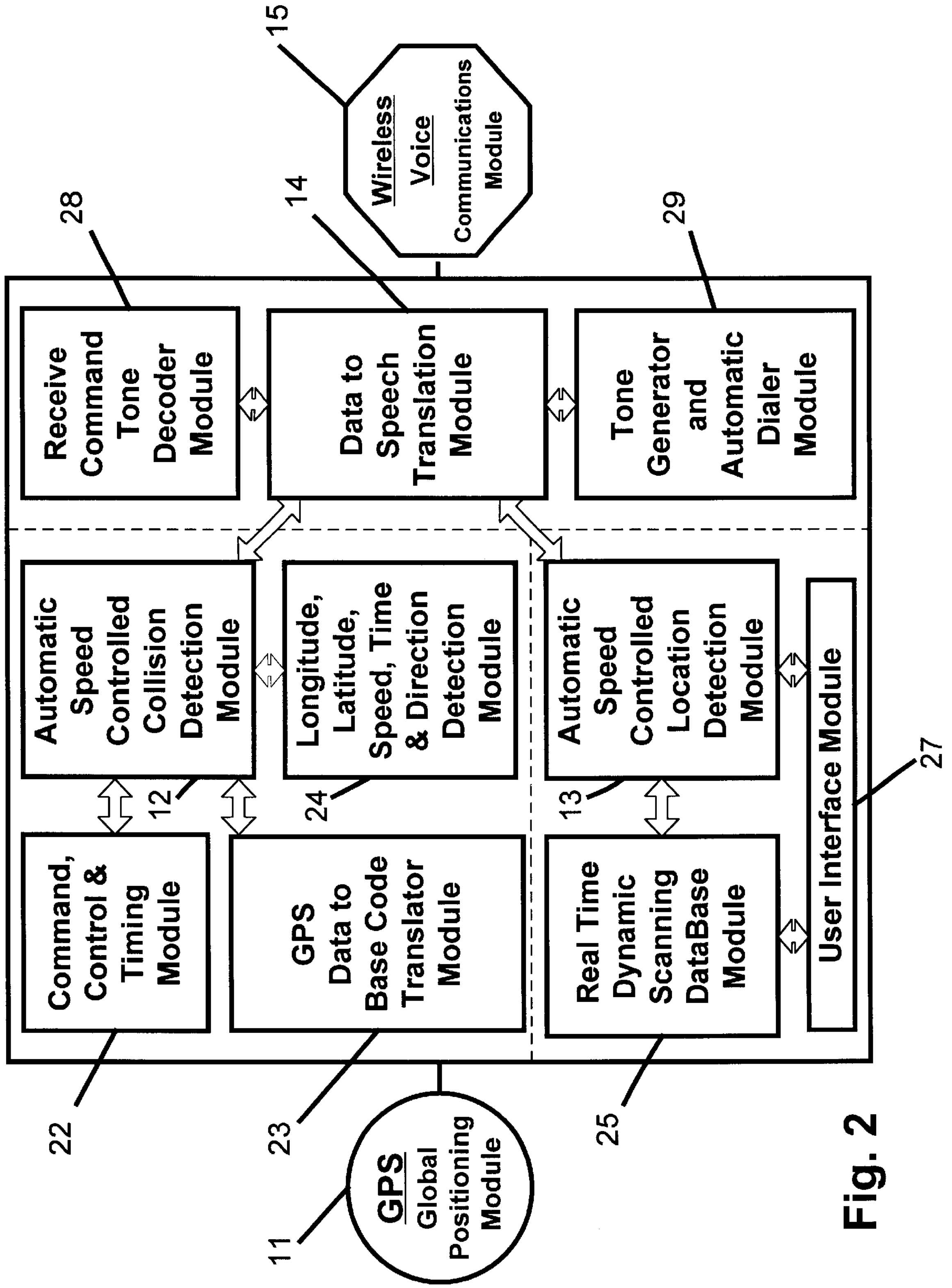
FIG. 2 illustrates a block diagram view of the present invention of FIG. 1A interactively communicating with its sub-modules.

An acceleration/deceleration and collision threshold generator 42 in communication with the Dynamic Scanning Database Module 25, FIG. 2 has logic or data structures that calculate acceleration/deceleration using data received from the speed differential detector and limit generator 41. The acceleration/deceleration and collision threshold generator 42 provides or calculates a dynamically selectable Collision Threshold value. Any Deceleration value greater than this Collision Threshold causes a vehicle collision to be reported. No collision is reported for Deceleration values below this collision Threshold Value, The selectable threshold level is dynamically controlled by the speed of the vehicle to compensate for the changes in the Inertial Forces of the vehicle with speed and its resulting changes in measured speed difference per second or acceleration/deceleration. Deceleration values are used to report vehicle front-end collisions while Acceleration values can be used to report rear end collisions.

To augment or enhance the determination of the selectable collision threshold Level Rapid Directional Change Detector 43 logic or data structure may, if desired, be implemented to compare the rate of change in the direction of travel of the vehicle to the speed of travel. The comparison is used to separate a "reasonable" directional change for a given speed, such as a vehicle turning versus a forced directional change such as a side or angular collision. Side impact and vehicle orientation sensors may also be employed.

In addition, a nearest location detector 44 logic or data structure determines or calculates the distance (range) and direction of the vehicle from the last known stored vehicle location, The data output of the speed differential detector and limit generator 41, velocity and collision threshold generator 42, rapid directional change detector 43, and nearest location detector 44 are combined and transmitted to the Data to Speech Translation Module 14, FIG. 2 (discussed herein).

Figure 5:
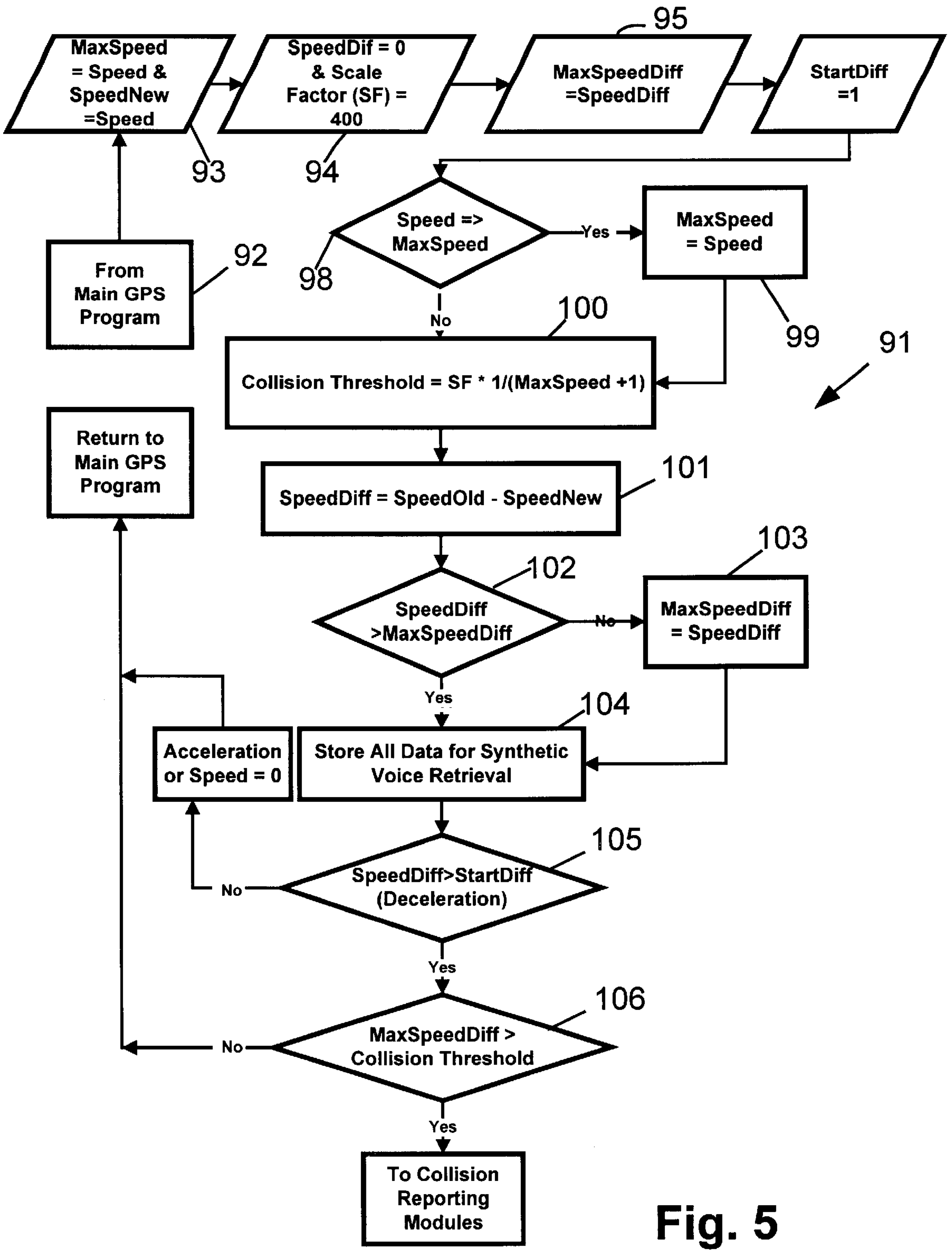
FIG. 5 illustrates a flow chart diagram view of the Automatic Speed Controlled Collision Detection Module of FIG. 2.

A logical flow of the determination of a collision 91, FIG. 5 by the Automatic Speed Controlled Collision Detection Module 12 begins with receiving base code data from the GPS Data to Base Code Translation Module 23, denoted at block 92, FIG. 5. With each receipt of new data from the GPS Data to Base Code Translation Module 23, the determination of whether a collision has occurred is initialized. The initialization begins when the maximum vehicle speed is equal to the vehicle speed generating a new vehicle speed 93. The speed differential is set to zero and a scale factor (SF) 94 is set to 400. The maximum vehicle speed differential is set to equal the vehicle speed differential 95. It has been empirically determined that 13 is a reasonable collision threshold value for a slow city/urban speed of 30-mph while 5.5 is a more appropriate value for a faster 70 mph highway speed. Solving equation 100 for the scale factor SF using these 2 sets of numbers yields an SF of about 400 under both speed conditions. The one added to Maxspeed in 100 adds little to the end result but removes the mathematical problem of division by zero if MaxSpeed equals zero.

If the speed of the vehicle is equal to or greater than the maximum speed 98, the maximum vehicle speed is made equal to the current vehicle speed 99 for use in the next 1-second system cycle. If the speed of the vehicle is less than the maximum 98, the collision threshold 100 is equal to scale factor multiplied by 1 divided by the maximum speed plus 1. The vehicle speed differential is equal to the stored value of speed i.e., old speed from 1 second earlier minus the newly derived vehicle speed 101.

If the vehicle speed differential is less than the maximum vehicle speed differential 102, the new deceleration is less than the old deceleration from 1 second earlier and the vehicle is slowing down at a slower rate. The maximum speed differential is then made equal to the new speed differential 103 for use during the next 1-second system cycle. If the vehicle speed differential is more than the maximum speed differential 102 the vehicle is slowing down at a faster rate indicating a possible collision in process. Thus all current data is stored for synthetic voice retrieval 104. If the vehicle speed differential is greater than the start differential 105, deceleration of the vehicle has occurred. If the vehicle speed differential is less than the start differential 105, no deceleration of the vehicle has occurred and probably no collision has occurred If the maximum vehicle speed differential is greater than the Collision threshold 106, a collision has occurred and the Automatic Speed Controlled Collision Detection Module 12 responds as discussed herein.

Figure 3:
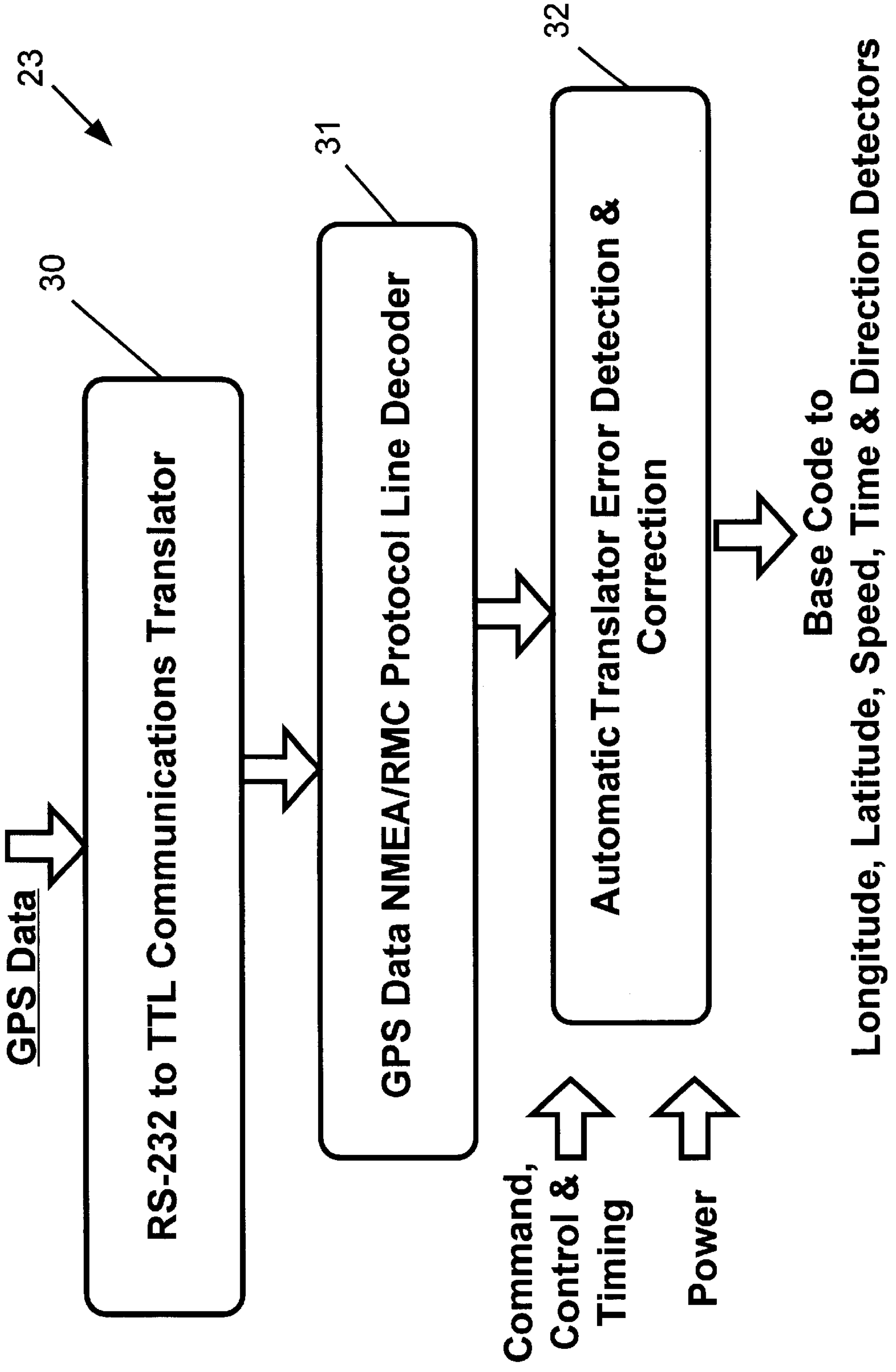
FIG. 3 illustrates a block diagram view of the GPS Data to Base Code Translation Module of FIG. 2.

The GPS Data to Base Code Translation Module 23 FIG. 3 is in continuous serial communication with the GPS receiver via a RS-232 cable. The GPS Data To Base Code Translation Module 23 has logic or data structures to facilitate the conversion and translation of raw data 30 received from the GPS receiver to a selected logic level that may be interpreted by any selected type of logical functions into navigational parameters. An example of a selected logical function is converting the serial data communication to TTL functional logic. The GPS Data to Base Code Translation Module 23 has logic or data structures to decode or extract 31 the RMC code from the received GPS data. The RMC code is the line of code containing the needed Navigation data and is extracted from the National Marine Electronic Association (NMEA) protocol Data packet being received from the GPS Module. The GPS Data to Base Code Translation Module 23 has logic or data structures to automatically detect any errors in the reception sequence of the RMC data. If an error is detected logic function 32 automatically corrects the error by resetting the RMC decode function and initiating a new decoding or extraction of RMC data. The data produced or resolved by the GPS Data to Base Code Translation Module 23 is base code data containing navigational parameters.

Figure 4:
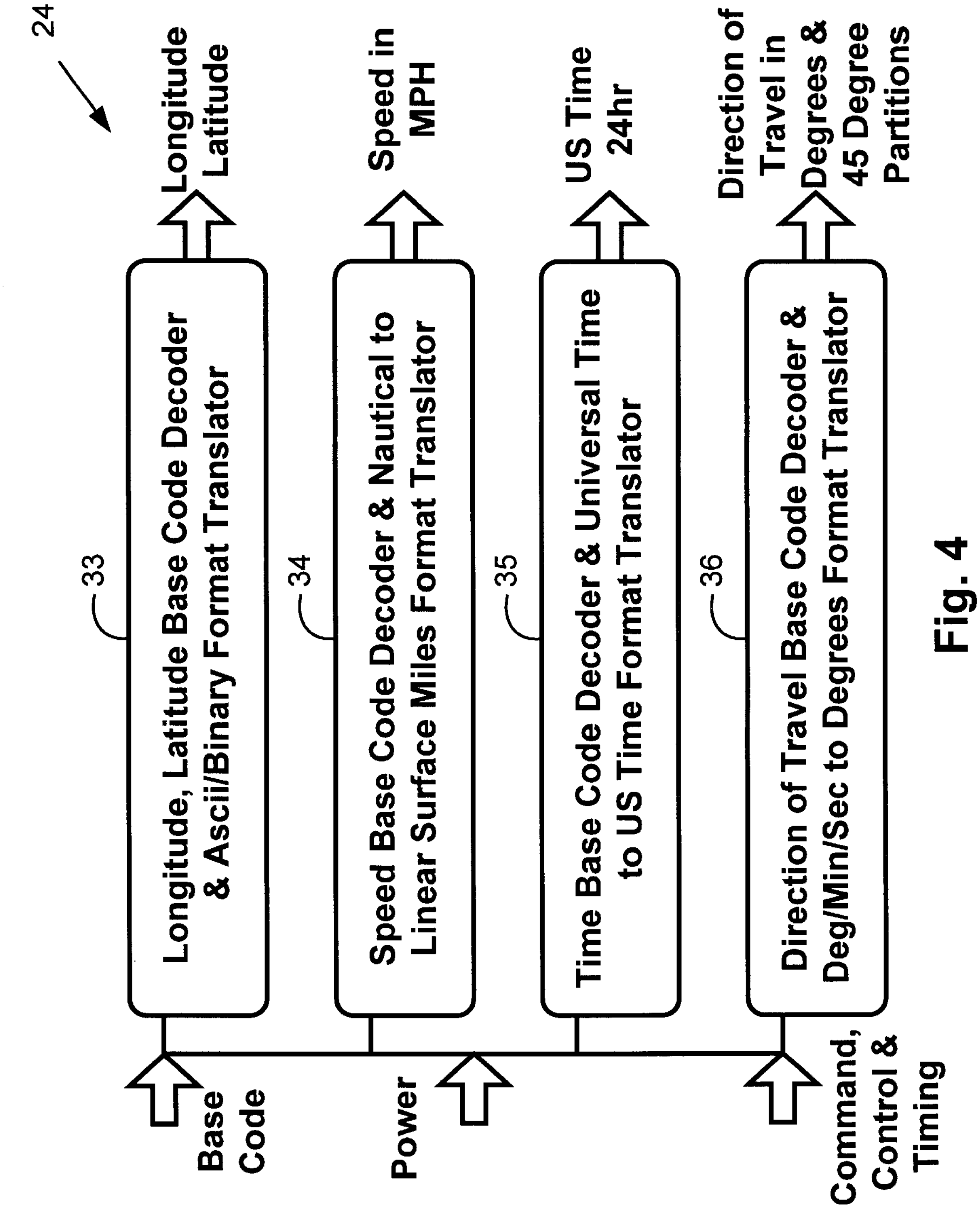
FIG. 4 illustrates a block diagram view of the Longitude, Latitude, Speed, Time, and Direction Detection Module of FIG. 2.

The Longitude, Speed, Time and Direction Detection Module 24 FIG. 4 has logic or data structures to extract from or transform the base code data pertaining to the real time position, speed, time, and direction of the vehicle, The Longitudinal, Latitude, Base Code Decoder and ASCII/BINARY format Translation 33 logic or data structure decodes or transforms the received GPS positional data from ASCII to a binary format for logical processing by the present invention 10. The Speed Base Code Decoder and Nautical to Linear miles format Translation 34 logic or data structure decodes or transforms the received base code and dynamically translates it from nautical knots to miles per hour.

The time base data decoder and universal time to United States (US) time 35 logic or data structure decodes or transforms the received base code into 24-hour based US time. The navigational direction of travel base code decoder and degree/minute/second to degrees format Translation 36 logic or data structure decodes or transforms the received base code into 360-degrees of the direction of travel of the vehicle. The 360-degree direction of travel is lo further partitioned into eight segments of 45-degrees each to provide a direction of travel "dead reckoning" function. These segments may, if desired, be labeled north, northeast, east, etc. and stored in memory as text for the Data To Speech Translation Module 14 to enunciate either locally, i.e., in the vehicle or remotely to the recipient or third party.

The Command, Control and Timing Module 22, FIG. 2 provides the command, control, and timing of events of the present invention 10. The Command, Control and Timing Module 22 coordinates all data inputs, outputs, and conflict resolution between event priorities of the present invention 10. For example, the Command, Control and Timing Module 22 receive either manual or automatic activation commands and function switching commands from the (to be discussed) Tone generator and Automatic Dialer Module 29. The Command, Control and Timing Module 22 integrates these commands or functions into the operation of the present invention 10 in concert with receiving timing signals from the Global Positioning Module 11. The resultant timing function coordinates the activities of vehicle events. The vehicle events are defined as data accumulation of activities with respect to attributes of the vehicle, the driver or occupants, time of day, speed, location, or collision of the vehicle.

Figure 6:
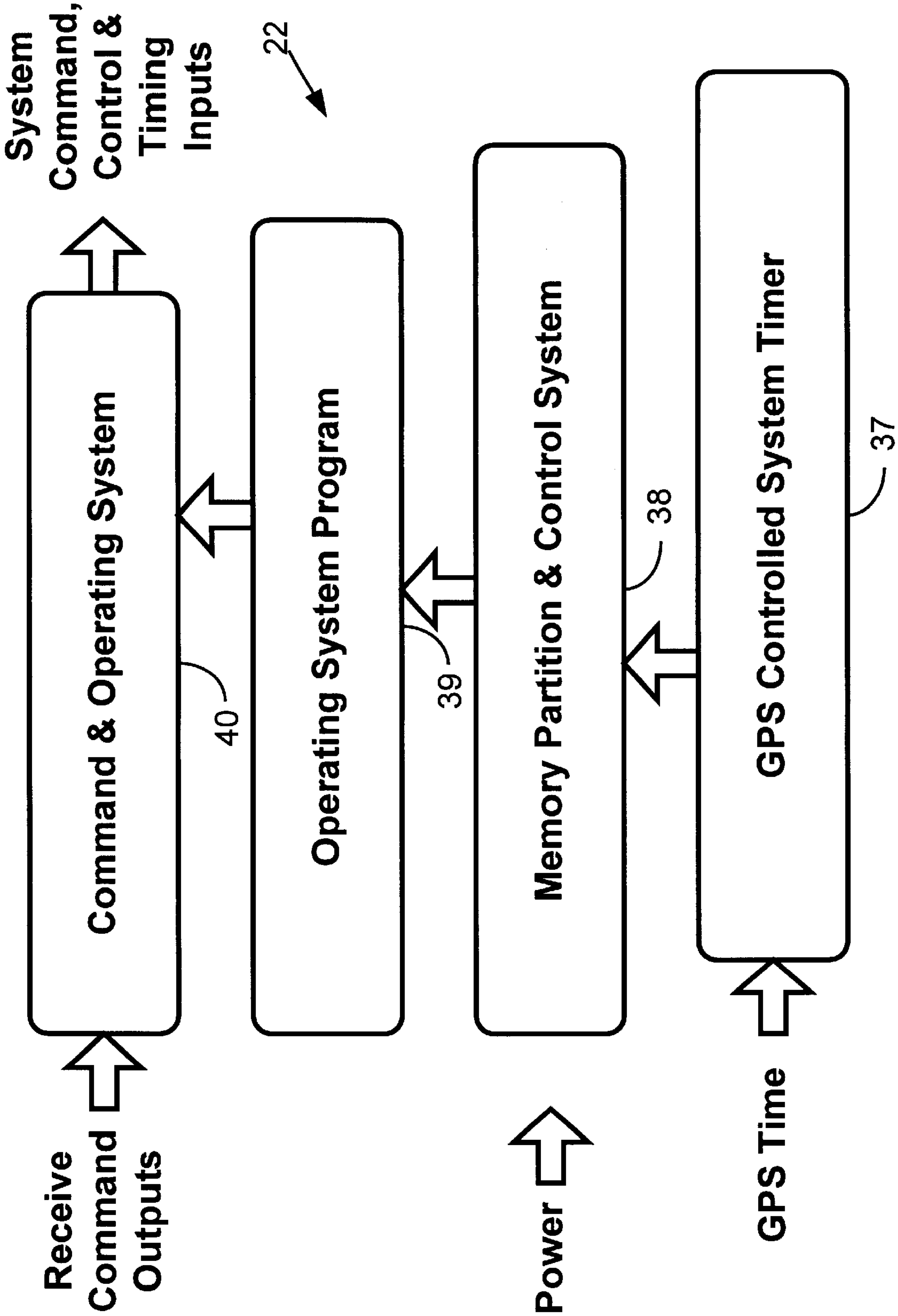
FIG. 6 illustrates a block diagram view of the Command, Control, and Timing Module of FIG. 2.

The Command, Control and Timing Module 22, FIG. 6 has logic or data structures to receive a selected repetition rate or signal from the Global Positioning Module 11 and creates a clocking system 37 to synchronize all modules, sub-modules, and switching functions of the present invention 10. The received repetition rate or signal may, if desired, be in the range of about 0.5-seconds to about 2-seconds. Preferably, the received repetition rate or signal is 1-second. A memory partition and control system 38 receives timing data from the GPS controlled system timer 37. The memory partition and control system 38 logic or data structure formulates or allocates memory partitions for temporary and memory stored data and may, if desired, archive selected file types. An operating system program 39 in communication with the memory petition and control system 38 has logic or data structures to coordinate and facilitate all system level processing functions for the present invention 10. A command and operating system 40 in communication with the operating system program 39 has logic or data structures to interpret local or manual activation commands from the user or driver of the vehicle or remotely from a recipient or third party via wireless communication and select received telephone tones.

Figure 10A:
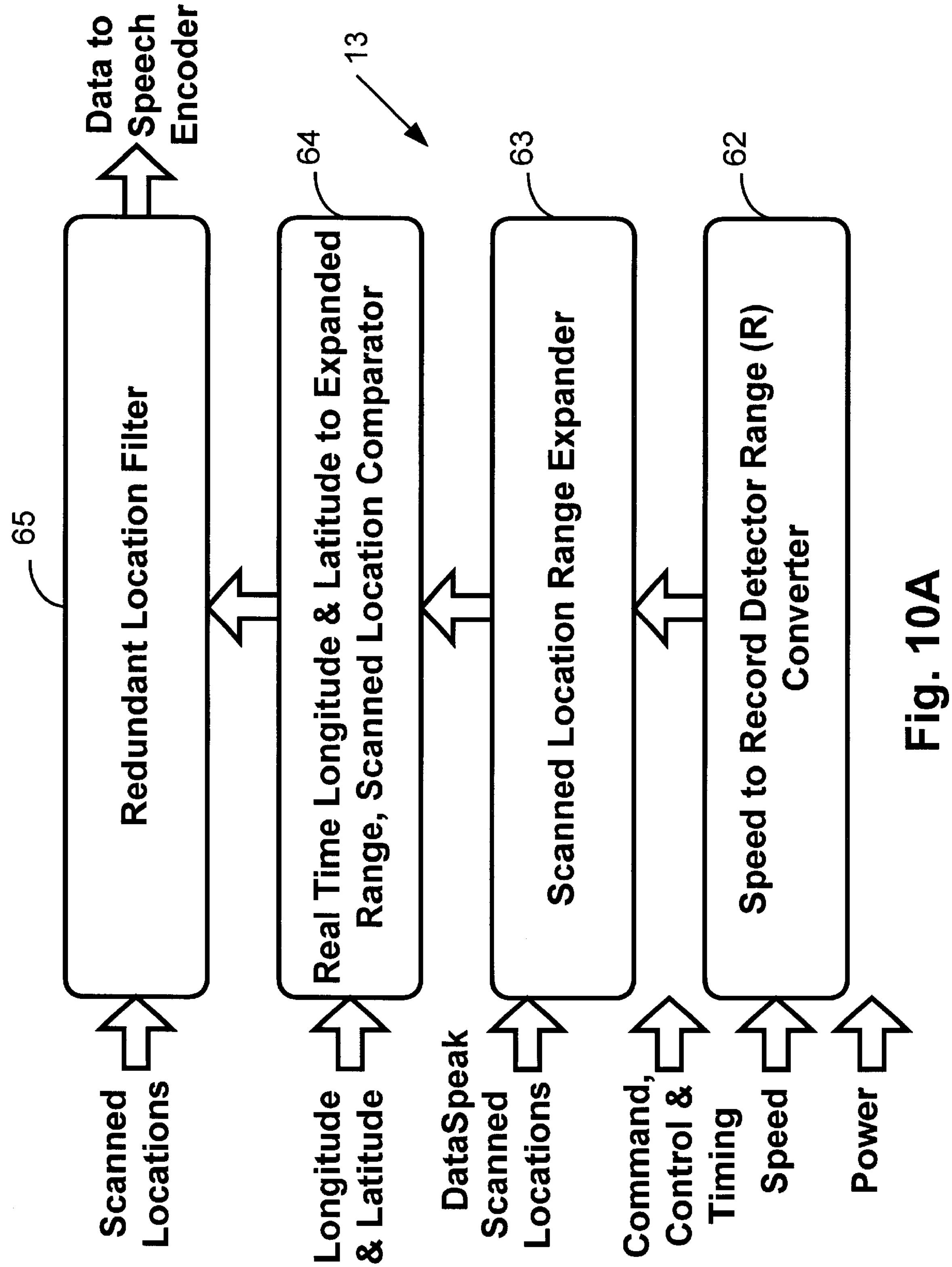
FIG. 10A illustrates a block diagram view of the Automatic Speed Controlled Location Detection Module of FIG. 2

The Automatic Speed Controlled Location Detection Module 13, FIG. 2 may, if desired, be in interactive communication with a Real Time Dynamic Scanning Database Module 25 and a User Interface Module 27. The Automatic Speed Controlled Location Detection Module 13, FIG. 10A has logic or data structures for determining a range (R) factor. The range factor enables the synthetic voice enunciation from the Data to Speech Translation Module 14 to announce the approaching of a selected intersection location. A Speed to Record Detector Range (R) Converter 62 dynamically converts the range to the selected intersection into selected values with respect to the speed of the vehicle i.e., smaller R-values for slower traveling vehicles and larger R-values for faster traveling vehicles. A scanned location range expander 63 logic or data structure adds the dynamic range R-value to each location record in the matched sub-file and the two sub-files to be scanned, (as discussed herein).

A real time longitudinal and latitude to expanded range and scanned location comparator 64 logic or data structure compares the expanded range R-value location records in the match sub-file to the real time current vehicle location. When a record match is found having values of latitude and longitude that the current latitude and longitude values fall within, a location match has occurred. If the initial vehicle position is borderline between the two sub-files and it has passed from one to the other during the matching process, the system then scans the two additional sub-files for a matching record. If no match is found, the Real Time Dynamic Scanning Database Module 25, FIG. 2 starts over following a 1 second time period and a request for new GPS data input from the Global Positioning Module 11. A redundant location filter 65 logic or data structure compares the newly matched location to the previous match location. If the two are the same, the new location is filtered out and the information or data sent to the speech encoder for local and remote enunciation is not sent again.

Figure 10B:
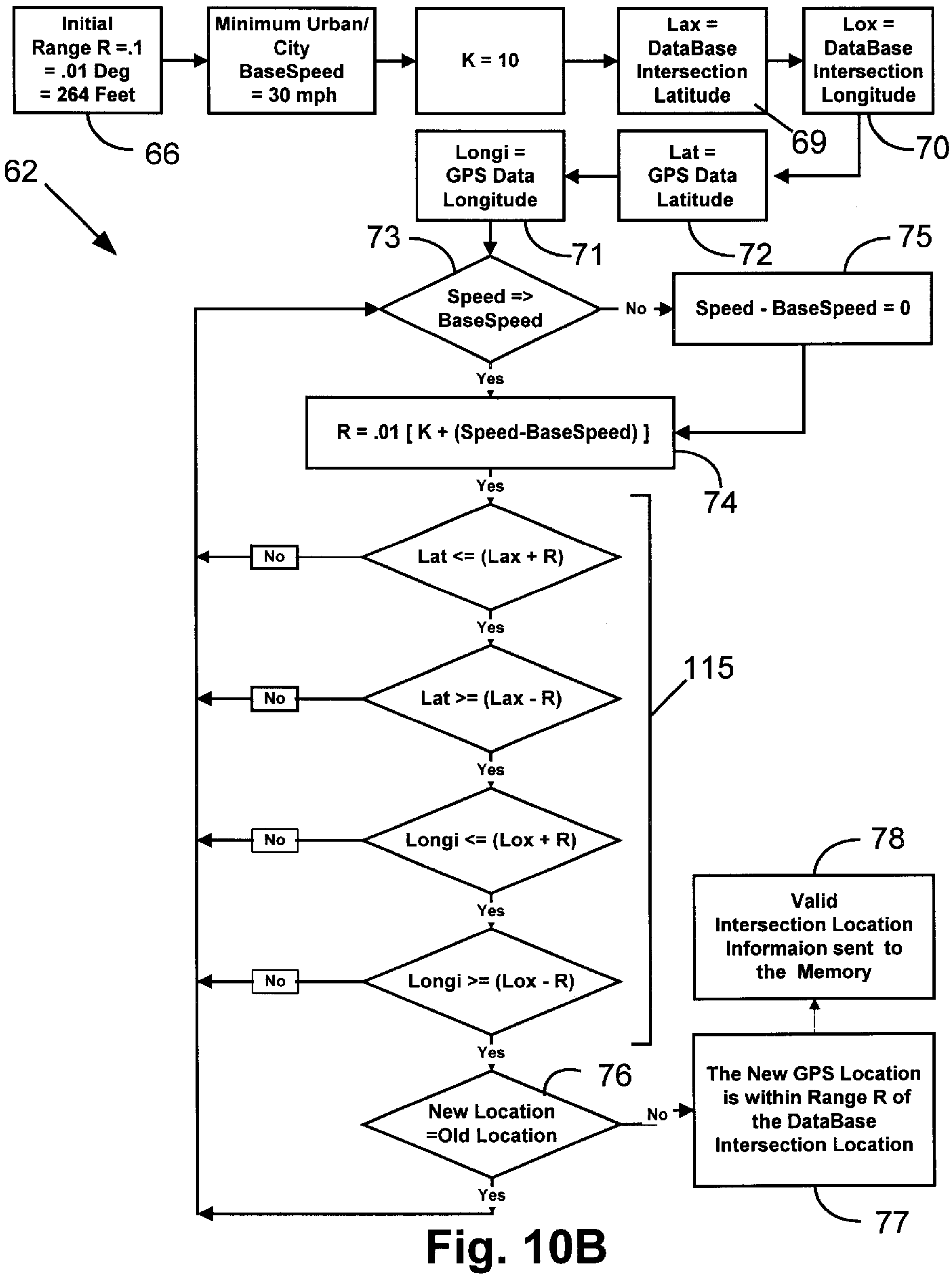
FIG. 10B illustrates a flow chart view of The Automatic Speed Controlled Location Comparator Module of FIG. 10A.

A logical flow diagram of the speed to record detector range (R) converter 62, FIG. 10B begins with an empirically derived initial range R-value 66 equal to a selected value. This value is determined from the fact that in Mid USA 0.01 degree of nautical distance is about 264 feet of surface distance. 264 feet is a reasonable Intersection Detection Range for a slow moving vehicle with a Base Speed of about 30 mph in an Urban/City environment. An Initial/Minimum R value of 0.1 corresponds to this minimum Range of 264 feet. Determination of the R-values for various speeds has been empirically measured by comparing various types of vehicles including their mass and Inertial Energy effects. Alternate values of initial and operating values for R and Minimum Base Speed may be appropriate for different vehicle types and specific applications. Given a Base Speed of 30 mph and a desired R of 0.1, solving for constant K in equation 74 yields K=10. Using this same value of K=10 and selecting a highway speed of 70 mph and keeping the base speed of 30 mph gives an R value of 0.5 for an Intersection Location Range of 1320 feet or ¼ mile. The stored vehicle intersection latitude location 69 and the stored vehicle longitude location 70 are retrieved from the database. The real time latitude 72 and the real time longitude 71 are received from the GPS Data to Base Code Translation Module 23. The current speed of the vehicle is determined and compared to the Base Speed.

If the current speed of the vehicle is greater than the Base Speed 73, the new R-value 74 is equal to the current speed minus the Base Speed plus K=10, multiplied by 0.01. If the current speed of the vehicle is less than the Base Speed the new R-value 74 is equal to K=10, multiplied by 0.01. Speed minus BaseSpeed 75 is made equal to zero to avoid negative values of R. The longitude and latitude 115 are resolved in relation to the R-value. The new location of the vehicle is determined from the newly derived longitude and the latitude data database values having -R- included. The new location of the vehicle is compared to the most recent location of the vehicle 76. If the new location is equal to the previous location, the present invention 10 determines that the vehicle has not moved to a new location and updating is not required. If the new location is not equal to the previous location, the new GPS location is within the range of the R-value of the database intersection location 77. The valid intersection location information or data Automatic Speed Controlled Location Detection Module 13 for further processing 78.

Figure 8:
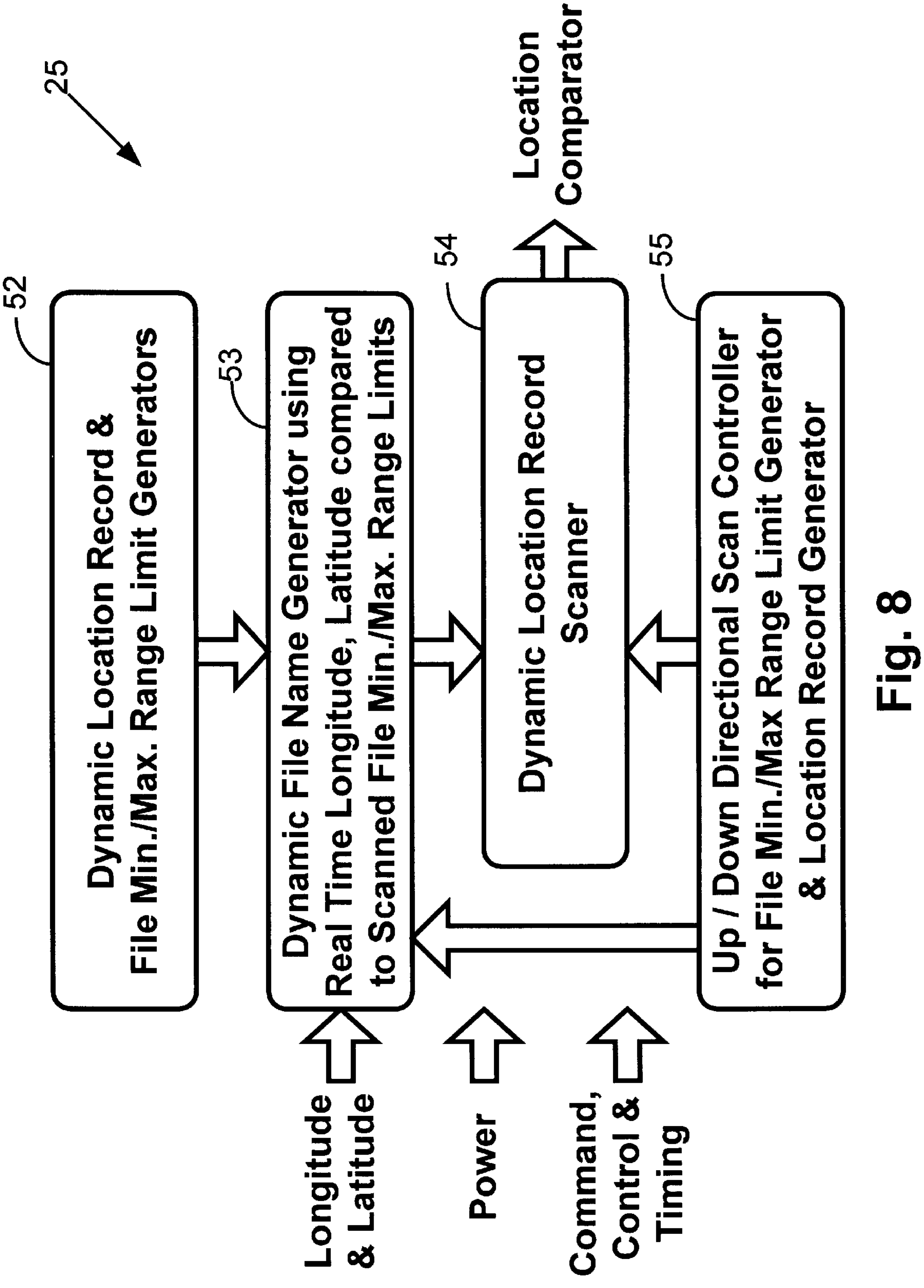
FIG. 8 illustrates a block diagram view of the Real Time Dynamic Scanning Database Module of FIG. 2.

The Real Time Dynamic Scanning Database Module 25, FIG. 8 has logic or data structures that select a database file to match the current position derived from the GPS Data to Base Code Translation Module 23. A dynamic location record and file minimum or maximum range limit 52 controls the selection process. The dynamic location record and file minimum or maximum range limit generator 52 splits a master location database file into smaller sub-files with each containing a selectable number of location records. The size of the sub-files is dependent on the overall size of the memory and processing speed of the controller implementing the present invention 10. The range limit generator then measures the minimum or maximum range in concert with the latitude/ longitude values of all the records contained in each sub-file and attaches these values to the end of that file. A dynamic file name generator 53 scans the added record in each of the sub-files comparing the minimum and maximum location values to the real time current latitude and longitudinal values. A match sub-file occurs when a sub-file is found which has minimum and maximum location values that enclose the current latitude and longitude. That sub-file is then selected for further processing and assigned a new file name. A dynamic location record scanner 54 searches for that selected matched sub-file and transmits the data contained in that file to the Automatic Speed Controlled Location Detection Module 13. An up/down directional scan controller 55 has logic or data structures that cause the dynamic file name generator 53 to select and name two additional sub-files. One has the minimum and maximum location values one level above and the other has one level below those values determined during the matched sub-file processing. The up/down directional scan controller 55 also causes the dynamic location record scanner 52 to transmit these additional two sub-files to the Automatic Speed Controlled Location Detection Module 13.

Figure 9:
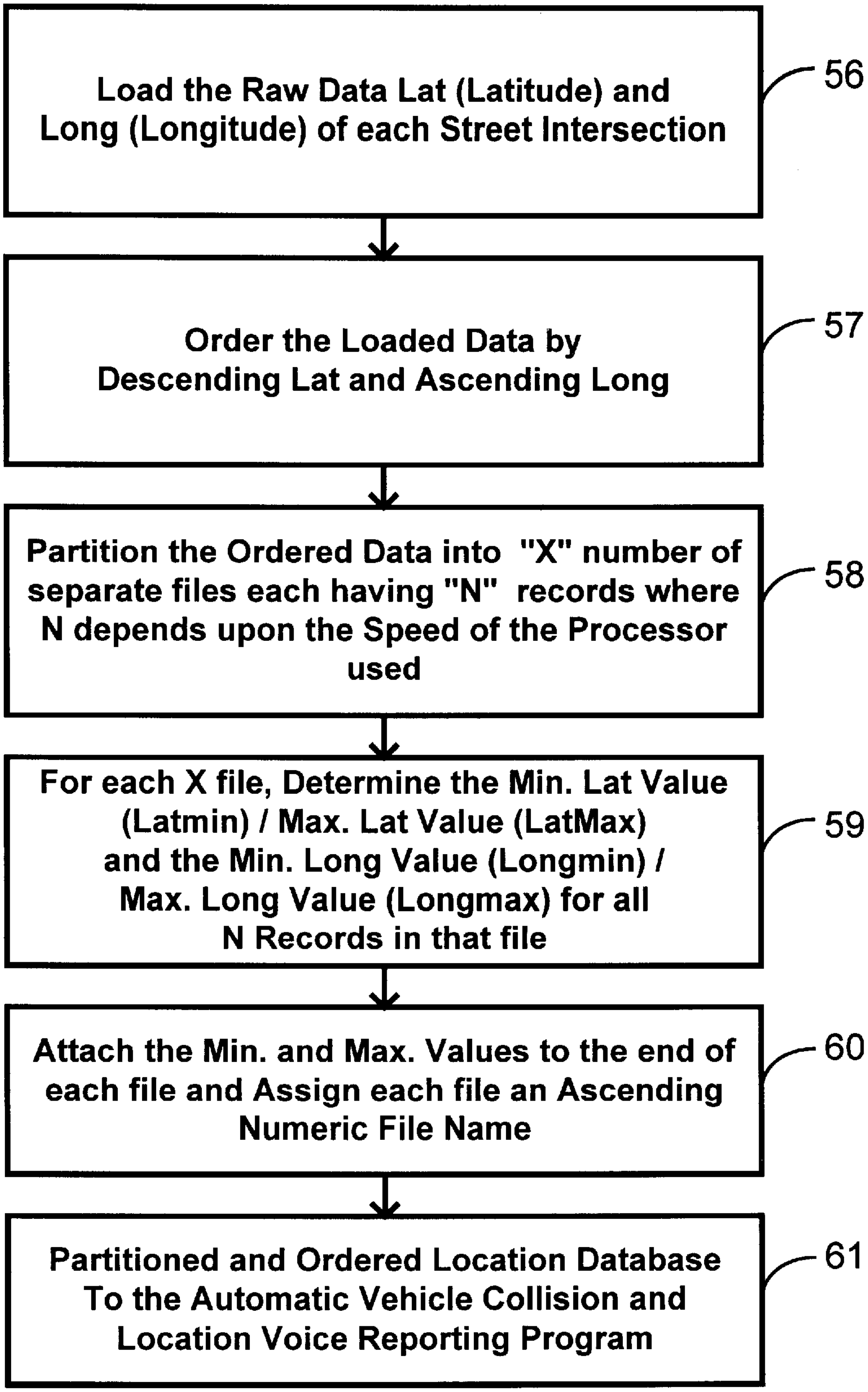
FIG. 9 illustrates a flow chart view of the location database partitioning and ordering functions.

A logical data flow of the above-discussed Real Time Dynamic Scanning Database Module 25, FIG. 9 begins with loading the raw latitude and longitude data of each street location 56. The loaded data is ordered by descending latitude and ascending longitude 57. The database is partitioned into a selected number of "X" files each having a selected "N" number of records 58. The "N" number is dependent upon the processing speed of the computer or controller implementing the present invention 10. For each "X" file the minimum latitude value, maximum latitude value, minimum longitude value and maximum longitude value is determined 59 for all "N" records in that file. The determined minimum and maximum values are attached 60 to the end of each file and each is assigned an ascending numeric file name. The files are then transmitted to the Automatic Vehicle Collision and Location Detection Module 13 for further processing 61.

Figure 11:
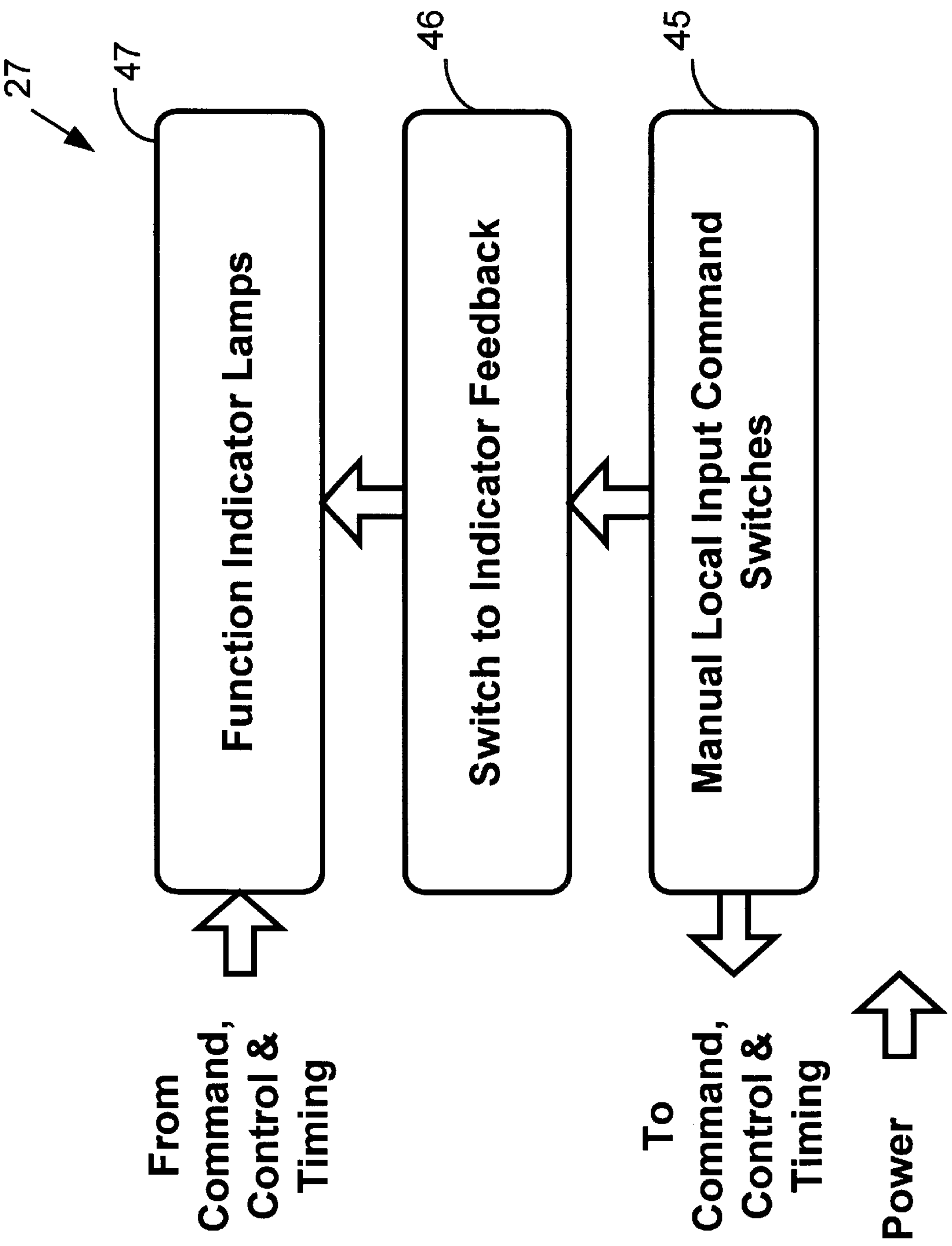
FIG. 11 illustrates a block diagram view of the User Interfaced Module of FIG. 2.

The User Interface Module 27, FIG. 2 has logic or data structures 27, FIG. 11 that permit the present invention 10 to be activated, if desired, in the manual mode. A manual local input command switch 45 receives a command or commands from the user to operate in the manual mode. If the manual mode is activated, the present invention 10 sends any select or all stored information concerning the vehicle and its occupants to the Data To Speech Translation Module 14 for transmission to a recipient or third party. When this function is activated via a switch to indicator feedback 46, a select control function indicator lamp(s) 47 is activated. For example, the function indicator lamp(s) are illuminated when the system is switched to the manual mode and a selected message is activated for output. Additional function indicator lamp(s) 47 provide visual indication of system operation such as applied power and input/output data flow for diagnostics.

Figure 12:
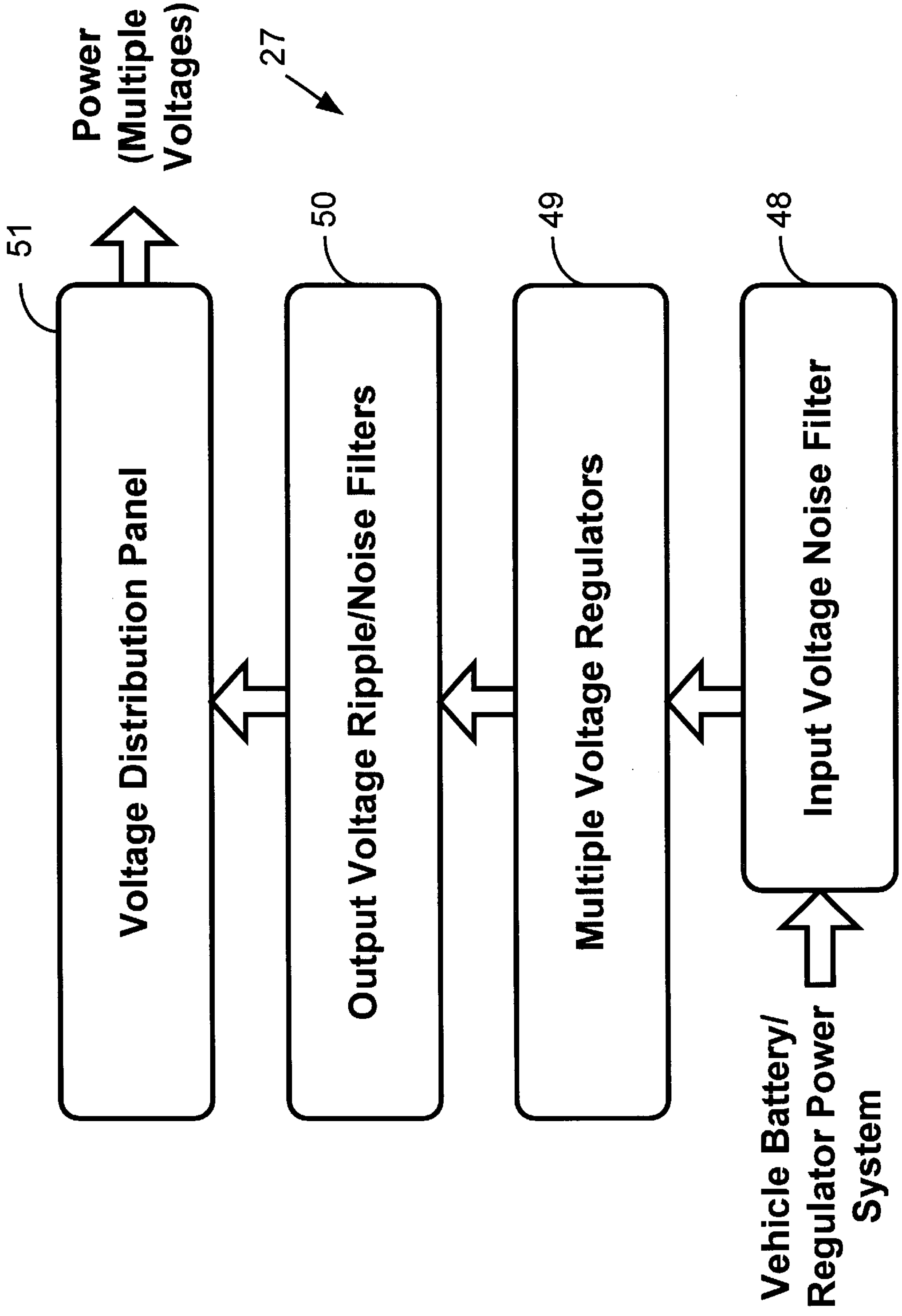
FIG. 12 illustrates a block diagram view of the Power System of the present invention.

The User Interface Module 27, FIG. 12 also provides logic or data structures to command and control an input voltage noise filter 48. The input voltage noise filter 48 controls or removes the electrical signal noise emanating from noise sources. Examples of noise sources are the applied power sources i.e., batteries, regulators, and the vehicle ignition system. The User Interface Module 27 contains multiple voltage regulators 49 to provide the present invention 10 with various system power level requirements. An output voltage ripple/noise filter 50 removes the power supply ripple and regulator noise from each of the different voltage level outputs. A voltage distribution panel 51 provides power to each of the modules or sub-modules that are connected to the present invention 10.

Figure 13:
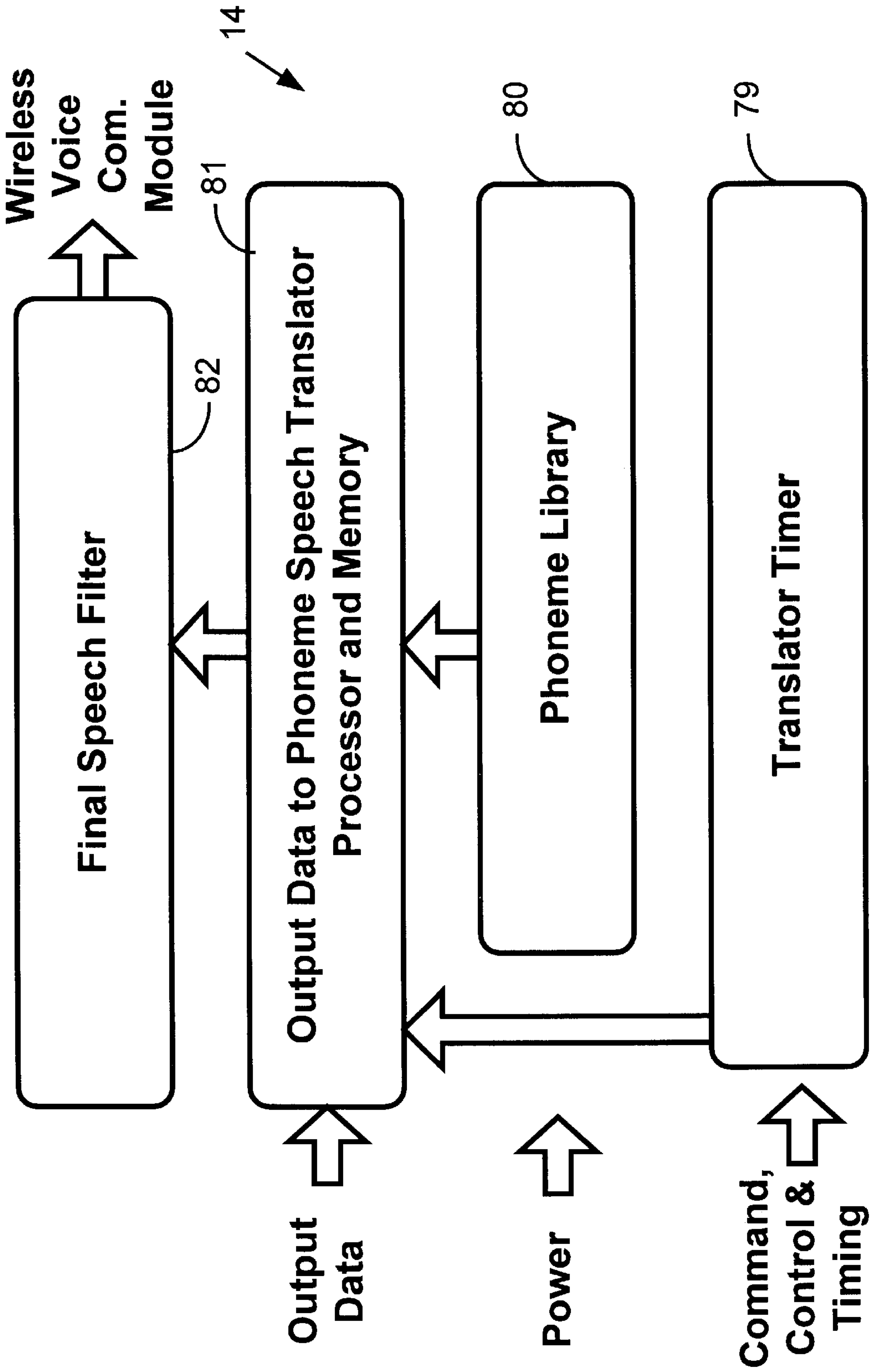
FIG. 13 illustrates a block diagram view of the Data to Speech Translation Module of FIG. 2.

The Data to Speech Translation Module 14, FIG. 2 may, if desired, be in interactive communication with a Tone Generator and Automatic Dialer Module 29, a Receiver Command Tone Decoder Module 28, and the Wireless Voice Communications Module 15. The Data to Speech Translation Module 14, FIG. 13 has logic or data structures for verifying and regulating the timing function of the transmissions of the location and collision data with respect to the GPS data via a Translation timer 79. The Data to Speech Translation Module 14 further has logic or data structures that command and control a phoneme library 80 containing all synthetic voice utterances and rules of speech in data or digital form. An output data to phoneme speech Translation 81 receives the combined data from the data output of the speed differential detector and limit generator 41, velocity and collision threshold generator 42, rapid directional change detector 43, and nearest location detector 44. The output data to phoneme speech Translation 81 translates the incoming information, data, or text to synthetic speech by matching the letters, words, and context of the text to contents of the phoneme library 80 and then outputs a digital or synthetic representation of a voice. A final speech filter 82 filters out time gaps and processing noise in the digital synthetic speech. The final speech filter 82 creates a close approximation of a true analog voice suitable for wireless communication to a recipient or third party.

Figure 14:
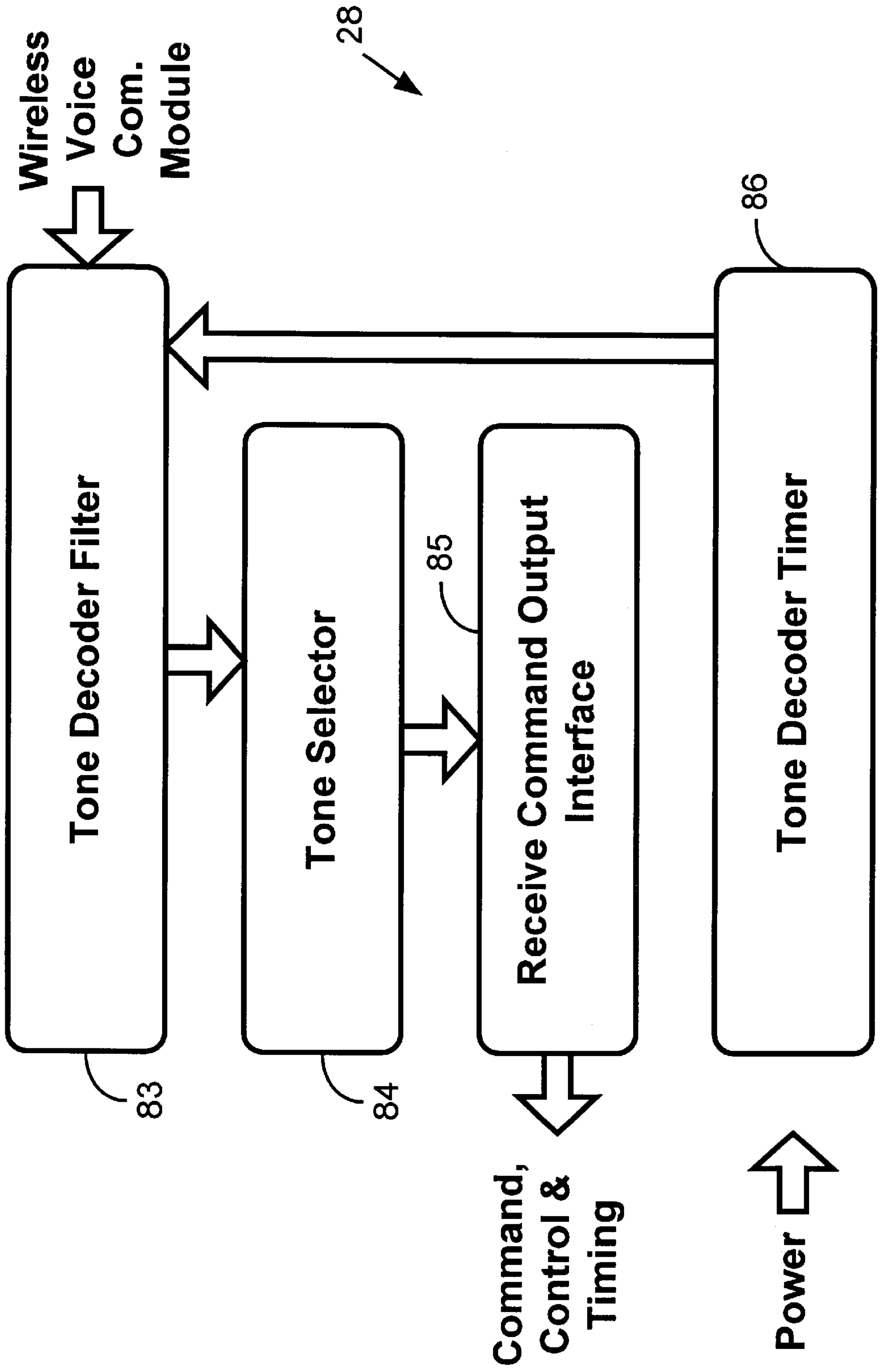
FIG. 14 illustrates a block diagram view of the Receive Command Tone Decoder Module of FIG. 2.

The Receive Command Tone Decoder Module 28, FIG. 14 in communication with the Wireless Voice Communications Module 15 has logic or data structures that command and control a tone decoder and filter 83 decodes all the dual frequency telephone tones sent from the recipient or third party and the special loop back tones being used for internal hardware logic switching functions. The tone decoder and filter 83 also filters out any extraneous transmission noise being received. A tone selector 84 selects a particular dual tone output that matches a specific system function command sent from the recipient or third party or used for internal switching functions. A receiver command output interface 85 converts each received dual tone output into its associated logic control or hardware switching function and sends the results to the Command, Control and Timing Module 22. Selected tones received from a recipient or third party may be used to remotely repeat previously sent information or retrieve different levels of additional information stored in the system memory of the vehicle. A tone decoder timer 86 generates the timing signals to decode the dual frequency telephone tones and it sends the correct timing signal to the tone decoder and filter 83.

Figure 15:
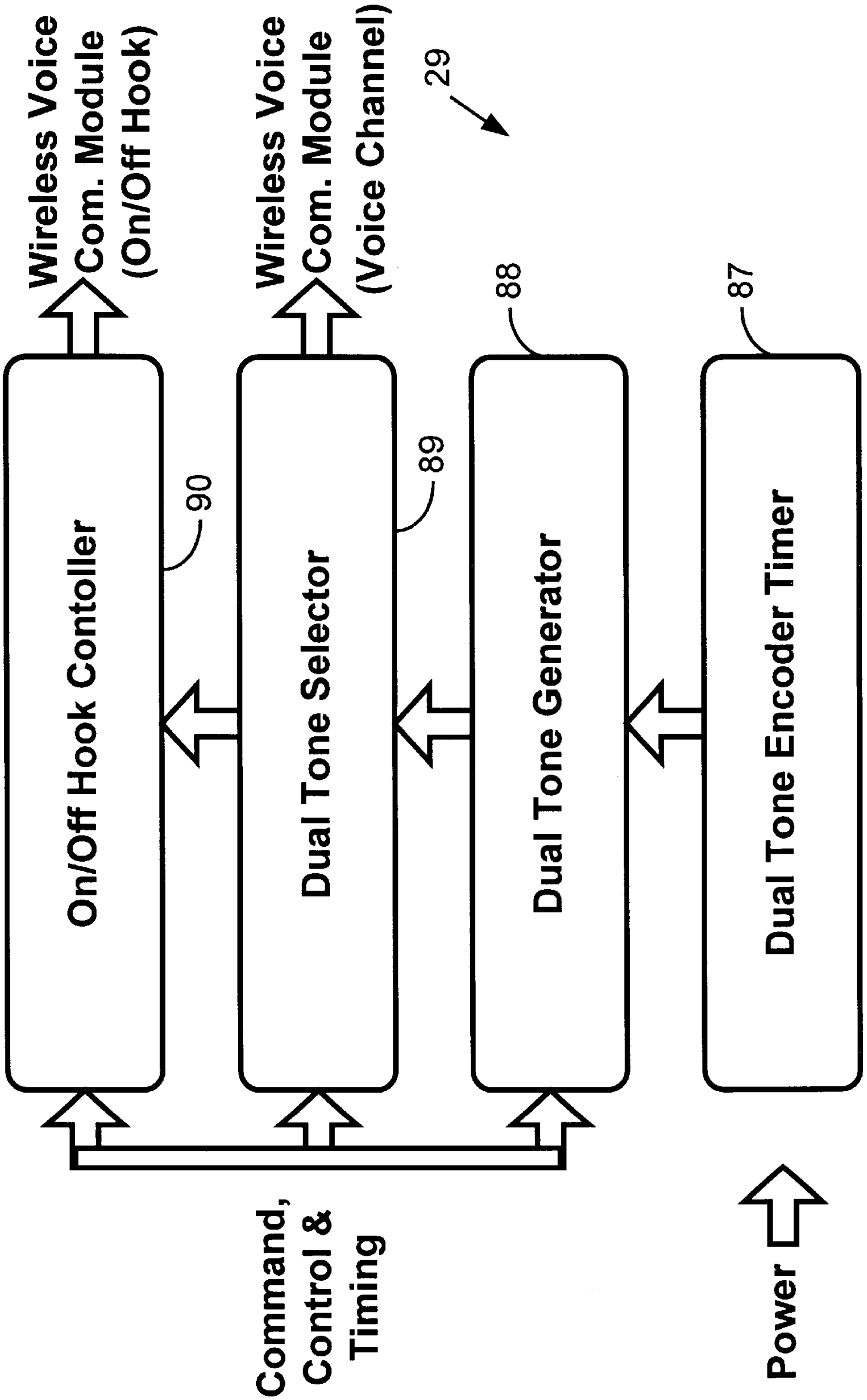
FIG. 15 illustrates a block diagram view of the Tone Generator and Automatic Dialer Module of FIG. 2.

The Tone Generator and Automatic Dialer Module 29, FIG. 15 in communication with the Wireless Voice Communications Module 15 has logic or data structures that command and control a dual tone encoder timer 87 to determine the timing signals required for dual tone generation. A dual tone generator 88 receives the timing signals from the dual tone encoder timer 87 and generates high band and low band frequencies that form the dual tones. The dual tone generator 88 adds the two frequencies together forming sixteen different dual tones for telephone dialing. A dual tone selector 89, receiving the dual tones from the dual tone generator 88, interprets calling directions from the Command, Control and Timing Module 22 and selects which dual tone is sent to the Wireless Voice Communications Module 15 to dial a selected telephone number. An on/off hook controller 90 receives the dialing instructions from the dual tone selector 89 and activates the controls of the on/off hook of telephone communication. When the on/off hook controller 90 is in the off hook mode, the Wireless Voice Communications Module 15 is activated and proceeds to dial the selected telephone number. Once the connection is verified, the synthetic voice message may be sent to the recipient or third party.

The present invention 10 may, if desired, be implemented by any combination of convenient hardware components or software programming language consistent with the precepts of the present invention or by any known means to those skilled in the art. A typical Global Position System Module 110, FIG. 16 is manufactured by TravRoute, Inc. with a manufacturer's part number of Co-Pilot 2000. The Global Position System Module 110 is connected to a Microprocessor Based Module 111 with an associated or connected Memory Module 112. The Microprocessor Based Module 111 is manufactured by J K Microsystems, Inc. and has a manufacturer's part number of Flashlite 386EX. The Memory Module 112 is manufactured by M-System, Inc. and has a manufacturer's part number of DiskOnChip 2000. The Microprocessor Based Module 111 is connected to a Speech Translation Module 113 manufactured by RC Systems, Inc. with a manufacturer's part number of V8600. The Speech Translation Module 113 is connected to a Wireless Voice Communications Module 114 manufactured by Motorola, Inc. with a manufacturer's part number of S1926D. The integration of the hardware component aspect of the present invention 10 is delineated herein.

The present invention 10 may, if desired, be programmed in any suitable programming language known to those skilled in the art. An example of a programming language is disclosed in *C Programming Language*, 2/e, Kernighan & Richtie, Prentice Hall, (1989). The integration of the software aspect with the hardware component of the present invention 10 is delineated herein.

The present invention 10 may, if desired, have three distinct operating modes: pre-collision with another vehicle or object, during the collision with another vehicle or object, and post-collision with another vehicle or object. Once electrical power is applied to start the vehicle by the user or driver the present invention 10 is automatically activated.

Figure 17:
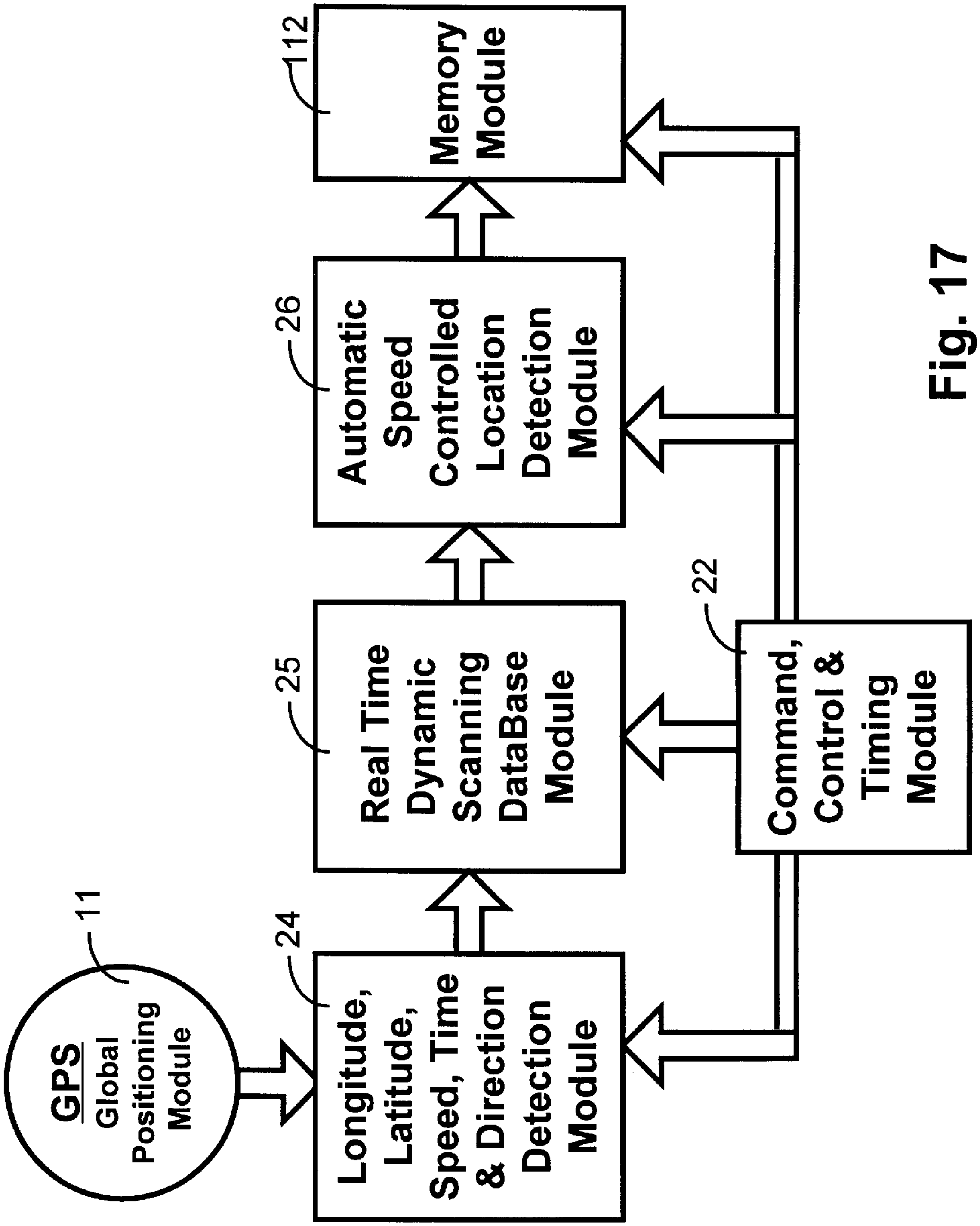
FIG. 17 illustrates a block diagram view of the operational aspect of FIG. 16 pre-collision.

The present invention 10, FIG. 17 begins receiving continuously updated navigational data at a selectable rate via the Global Positioning Module 11. The navigational data is decoded into the vehicle's present speed, time of day, direction, and location in terms of longitude and latitude via the Longitude, Latitude, Speed, Time, and Direction Detection Module 24. The Real Time Dynamic Scanning Database Module 25 receives the decoded navigation data and performs a match with its stored longitude and latitude street intersection locations, as delineated herein. The present invention 10 recognizes an approaching street intersection location from a selected distance from the vehicle. The distance or range to the street intersection location is dynamically controlled by the speed of the vehicle. When the longitude and latitude of the present location of the vehicle falls within the speed controlled range of the Automatic Speed Controlled Location Detection Module 26, a valid match occurs as delineated herein. All navigational data, scanning, and matched location data is stored in the System Memory Module 112 by the Command, Control, and Timing Module 22. The Command, Control, and Timing Module 22 ascertains that no collision has occurred; therefore, the present invention 10 is updated with new navigational data from the Global Positioning Module 11. This process continues while the vehicle is operating until it is involved in a collision with another vehicle or object.

Figure 18:
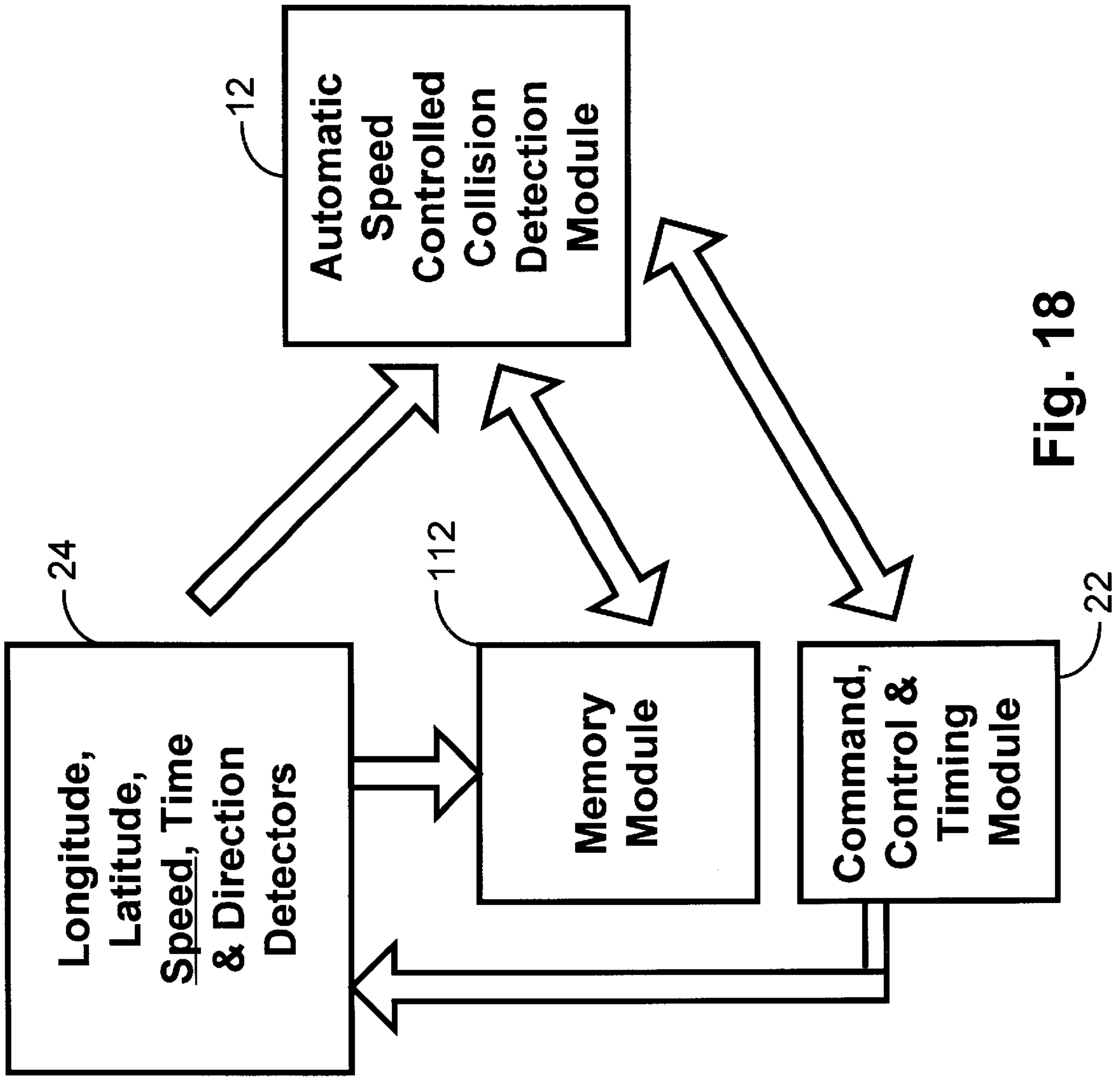
FIG. 18 illustrates a block diagram view of the operational aspect of FIG. 16, during a collision.
Figure 19:
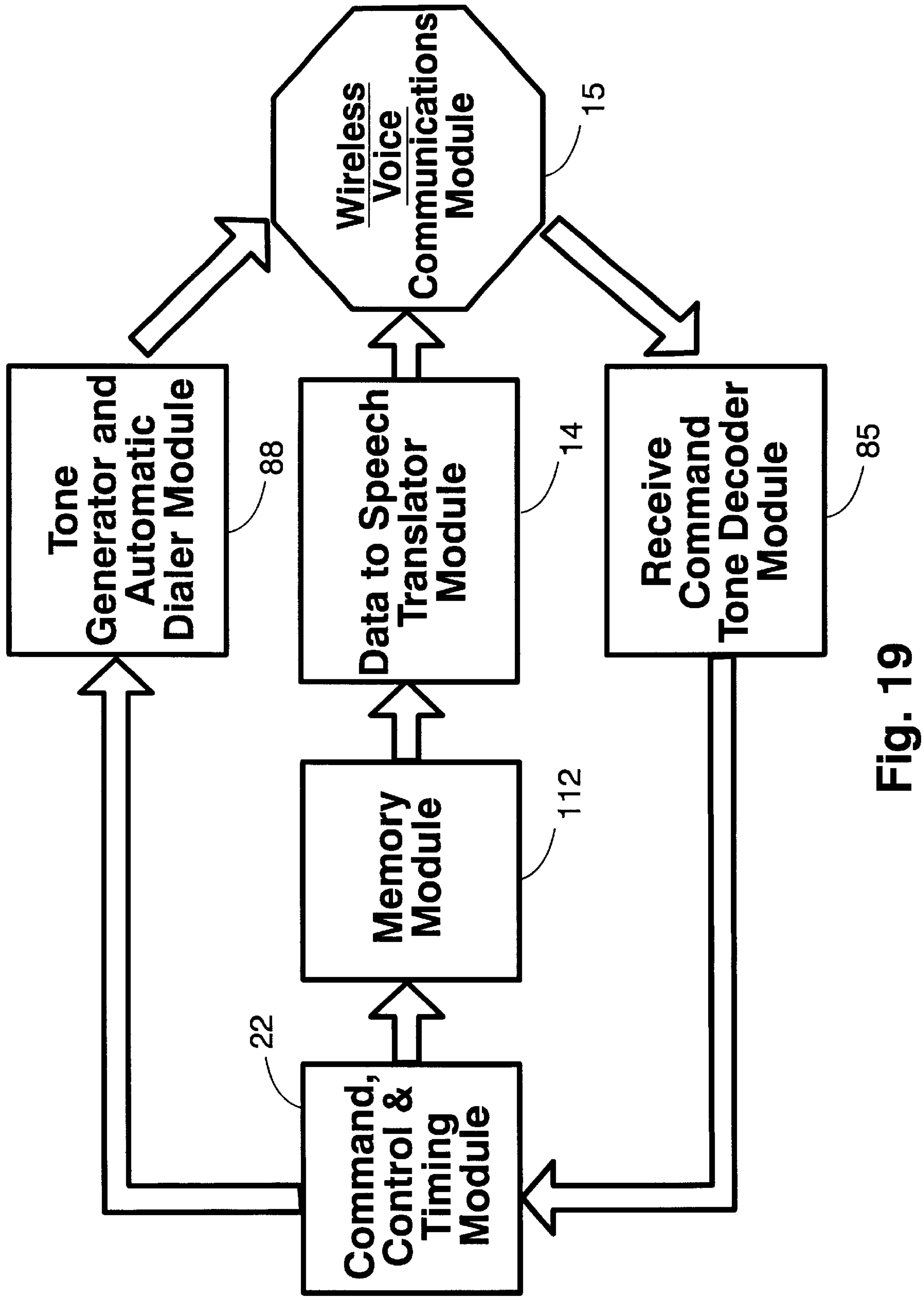
FIG. 19 illustrates a block diagram view of the operational aspect of FIG. 16, during post-collision.

When the vehicle containing the present invention 10, FIG. 18 is involved in a collision with another vehicle or object all the data concerning the vehicle's location and pertinent user data is stored in the System's Memory Module 112 via the Automatic Speed Controlled Collision Detection Module 12. Under the control of the Command Control and Timing Module 22, FIG. 19 the collision data is transformed into voice data by the Data to Speech Translation Module 14. The off-hook indicator in the vehicle indicates the wireless communication link has been activated. The Tone Generator and Automatic Dialer Module 88 provide the Wireless Voice Communications Module 15 with the selected tones to dial any selected telephone number of the recipient or third party via an analog or digital telephone. The Data to Speech Translation Module 14 sends a synthetic voice request for transmittal confirmation. Once the Wireless Voice Communications Module 15 receives this transmittal confirmation command from the intended recipient or third party the Data to Speech Translation Module 14 can begin the synthetic voice transmission of the data concerning the vehicle's location and pertinent user data. The transmittal confirmation command may, if desired, be tones generated by the intended recipient or third party using their telephone. In addition to transmittal confirmation, the recipient or third party may be directed from the data received from the vehicle to press or dial numbers on their telephone Tone keypad in a selected order to have the vehicle re-send the previous information or send additional user and vehicle data. The recipient or third party may also use their Tone keypad to call the vehicle and with the proper identification request specific stored or real time information such as location, speed and direction.

The Command Control and Timing Module 22 may, if desired, have data structures contained therein to repeat the initial communication effort by instructing the Wireless Voice Communications Module 15 to redial the initially selected telephone number. The redialing may, if desired, continue for a selected period of time. Typically, the redial period is from 3 seconds to about 3 minutes. Preferably, the redialing process is for 45 seconds. In the event the Receive Command Tone Decoder Module 85 does not receive the transmittal confirmed command from the intended recipient or third party within a selected period of time the Command Control and Timing Module 22 will instruct the Tone Generator and Automatic Dialer Module 88 to provide the Wireless Voice Communications Module 15 with an alternate or subsequent recipient or third party telephone number. This redialing process continues until the communication link with the recipient or third party is established. The Command Control and Timing Module 22 may, if desired, repeat the entire dialing process any selected number of times until a communication link is established with the recipient or third party.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims, means-plus-function clause is intended to cover the structures described herein as performing the recited function and not only structural equivalents but also equivalent structures. Thus, although a nail and a screw may not be structural equivalents in that a nail employs a cylindrical surface to secure wooden parts together whereas a screw employs a helical surface, in the environment of fastening wooden parts, a nail and a screw may be equivalent structures.

I claim:

1. A apparatus for automatic vehicle location, collision notification, and synthetic voice communication, the apparatus having a controller with a memory, a Global Positioning System, and means for wireless communication connectively disposed within a vehicle, the memory having stored therein a plurality of data structures formulated into instruction modules to direct the functioning of the controller, the memory further having stored therein at least one navigational location record comprising:

a) a Global Positioning Module receiving data from the Global Positioning System, said Global Positioning Module selectively translating said received data into the vehicle's present navigational position;

b) an Automatic Speed Controlled Location Detection Module in communication with said Global Positioning Module, said Automatic Speed Controlled Location Detection Module dynamically searching the memory for a match between said vehicle's present navigational position and the navigational location record;

c) an Automatic Speed Controlled Collision Detection Module receiving at least one vehicle collision indicator from at least one vehicle collision sensor;

d) said Automatic Speed Controlled Collision Detection Module in communication with said Automatic Speed Controlled Location Detection Module, said Automatic Speed Controlled Collision Detection Module formulating said match between said vehicle's navigational position and the navigational location record into a collision event;

e) a Data to Speech Translation Module in communication with said Automatic Speed Controlled Collision Detection Module, said Data to Speech Translation Module translating said collision event into a synthetic voice;

whereby means for said wireless communication transmits said synthetic voice.

2. A controller as recited in claim 1 further comprising:

f) a Dynamic Speed to Record Detector Range Converter in communication with said Automatic Speed Controlled Location Detection Module;

h) said Dynamic Speed to Record Detector Range Converter having at least one range factor data structure relative to the speed of the vehicle;

i) said range factor data structure transforming at least one navigational record into a look-ahead navigational record;

whereby said Dynamic Speed to Record Detector Range Converter continuously communicates expected vehicle navigation position relative to the speed of the vehicle.

3. A controller as recited in claim 2 further comprising:

a) a Receive Command Tone Decoder Module in communication with means for wireless communication, said Receive Command Tone Decoder Module having at least one tone selector data structure receiving at least one tone generated by a recipient of said synthetic voice;

b) said Receive Command Tone Decoder Module transforming said received tone into at least one command logic function;

c) a Command, Control and Timing Module in communication with said Receive Command Tone Decoder Module, said Command, Control and Timing Module responsive to said command logic function;

whereby said recipient of said synthetic voice being in communication with the apparatus for automatic vehicle location, collision notification, and synthetic voice communication.

4. A controller as recited in claim 3 wherein said Global Positioning Module translating data selected from the group consisting of navigational parameters and timing data.

5. A controller as recited in claim 4 wherein said Automatic Speed Controlled Module prioritizes the transmittal of said synthetic voice.

6. A controller as recited in claim 5 wherein said transmittal priorities being selected from the group consisting of in-vicinity emergency facilities, vehicle maintenance facilities, and telephone voice-mail.

7. A controller as recited in claim 6 wherein said Automatic Speed Controlled Module in a manual mode prioritizes the transmittal of said synthetic voice.

8. A controller as recited in claim 7 wherein said Wireless Voice Communications Module receiving at least one transmittal confirmation from said selected group consisting of in-vicinity emergency facilities, vehicle maintenance facilities, and telephone voice-mail.

9. An article of manufacture comprising:

a) a computer usable medium having computer readable program code means embodied therein for causing a response to a vehicular collision, said computer readable program code means in the article of manufacture comprising:

b) computer readable program code means for causing a computer to selectively formulate a collision event relative to said vehicular collision and navigational vehicular positional data received from a global positioning system;

c) computer readable program code means for causing a computer to translate said collision event into a synthetic voice; and d) computer readable program code means for causing a computer to selectively transmit said synthetic voice via a means for wireless communication.

10. A computer data signal embodied in a transmission medium, the transmission medium being a product of wireless bi-directional communication between a vehicle transceiver and at least one remote facility transceiver, comprising:

a) a synthesized speech segment embedded in the transmission medium, comprising a collision event;

b) said collision event being transmitted by the vehicle to at least one remote facility transceiver;

c) an audible tone responsive to said transmitted collision event being embedded in the transmission medium;

whereby the remote facility transceiver transmits said audible tone embedded in the transmission medium.

11. A method for automatic vehicle location, collision notification, and synthetic voice communication, comprising a controller with a memory, a Global Positioning System, and means for wireless communication connectively disposed within a vehicle, the memory having stored therein a plurality of data structures formulated into instruction modules to direct the functioning of the controller, the memory further having stored therein at least one navigational location record, comprising the steps of:

a) receiving global position data from the Global Positioning System;

b) translating said received data into the vehicle's present navigational position;

c) searching the memory of the controller for a match between said navigational position and the navigational location record;

d) receiving at least one vehicle collision indicator from at least one vehicle collision sensor;

e) formulating said match between said navigational position and the navigational location record into a collision event;

f) translating said collision event into a synthetic voice; and g) transmitting said synthetic voice to a selected third party.

* * * * *